US012586607B2

(12) United States Patent
Huang et al.

(10) Patent No.: US 12,586,607 B2
(45) Date of Patent: Mar. 24, 2026

(54) MULTIMEDIA PROCESSING METHOD AND APPARATUS BASED ON ARTIFICIAL INTELLIGENCE, AND ELECTRONIC DEVICE

(71) Applicant: TENCENT TECHNOLOGY (SHENZHEN) COMPANY LIMITED, Shenzhen (CN)

(72) Inventors: Gui Huang, Shenzhen (CN); Shuai Tang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 554 days.

(21) Appl. No.: 17/977,590

(22) Filed: Oct. 31, 2022

(65) Prior Publication Data

US 2023/0057566 A1    Feb. 23, 2023

Related U.S. Application Data

(63) Continuation of application No. PCT/CN2021/102803, filed on Jun. 28, 2021.

(30) Foreign Application Priority Data

Aug. 19, 2020    (CN) .......................... 202010837810.8

(51) Int. Cl.
*G11B 27/031*    (2006.01)
(52) U.S. Cl.
CPC .................................. *G11B 27/031* (2013.01)

(58) Field of Classification Search
None
See application file for complete search history.

(56) References Cited

U.S. PATENT DOCUMENTS

| | | | | |
|---|---|---|---|---|
| 9,432,581 B2 * | 8/2016 | Nakamura | ........... | G06V 40/169 |
| 9,754,355 B2 * | 9/2017 | Chang | ..................... | G06F 16/50 |
| 11,164,353 B2 * | 11/2021 | Luo | .......................... | G06T 11/60 |
| 11,546,734 B2 * | 1/2023 | Somanath | .............. | H04N 7/183 |

(Continued)

FOREIGN PATENT DOCUMENTS

| | | |
|---|---|---|
| CN | 103679800 A | 3/2014 |
| CN | 104571516 A | 4/2015 |

(Continued)

OTHER PUBLICATIONS

China National Intellectual Property Administration (CNIPA) Office Action 1 for 202010837810.Apr. 8, 21, 2021 88 Pages (including translation).

(Continued)

*Primary Examiner* — Gelek W Topgyal
(74) *Attorney, Agent, or Firm* — Anova Law Group, PLLC

(57) ABSTRACT

A multimedia processing method includes: obtaining, in response to an editing operation for a multimedia file, a material editing mode and an interaction template corresponding to a type of a material in the multimedia file; identifying the material in the multimedia file according to the material editing mode, and applying the interaction template to the identified material; and displaying the multimedia file after the interaction template is applied.

16 Claims, 13 Drawing Sheets

(56) References Cited

U.S. PATENT DOCUMENTS

| | | | |
|---|---|---|---|
| 2013/0141605 A1* | 6/2013 | Kim | H04N 1/3872 348/222.1 |
| 2014/0309919 A1* | 10/2014 | Ricci | A61B 5/0077 701/301 |
| 2017/0229146 A1* | 8/2017 | Garak | G06F 3/04845 |
| 2018/0157455 A1 | 6/2018 | Troy et al. | |
| 2020/0120366 A1 | 4/2020 | Su | |
| 2021/0201545 A1* | 7/2021 | Luo | G06T 11/60 |
| 2022/0076497 A1* | 3/2022 | Goodrich | G06T 19/006 |
| 2022/0222875 A1* | 7/2022 | Gupta | G06T 11/20 |

FOREIGN PATENT DOCUMENTS

| | | |
|---|---|---|
| CN | 105931096 A | 9/2016 |
| CN | 106028217 A | 10/2016 |
| CN | 108010037 A | 5/2018 |
| CN | 108833818 A | 11/2018 |
| CN | 109191370 A | 1/2019 |
| CN | 109309802 A | 2/2019 |
| CN | 109474850 A | 3/2019 |
| CN | 110856039 A | 2/2020 |
| CN | 111178343 A | 5/2020 |
| CN | 111914523 A | 11/2020 |

OTHER PUBLICATIONS

The World Intellectual Property Organization (WIPO) International Search Report for PCT/CN2021/102803 Sep. 28, 2021 8 Pages (including translation).

Kun Wang, "The Design and implementation of Generic Object Detection Module in Magic Camera," May 2018, Nanjing University.

China National Intellectual Property Administration (CNIPA) Office Action 1 for 202010837810.Sep. 8, 09, 2021 18 Pages (including translation).

"How to open the mobile phone QQ video interactive mode Tencent QQ video effects interactive mode gameplay" Nov. 2, 2017.

"Mobile phone QQ heart gestures where and how to get QQ video heart effect settings open." Aug. 10, 2018.

* cited by examiner

Terminal device 400

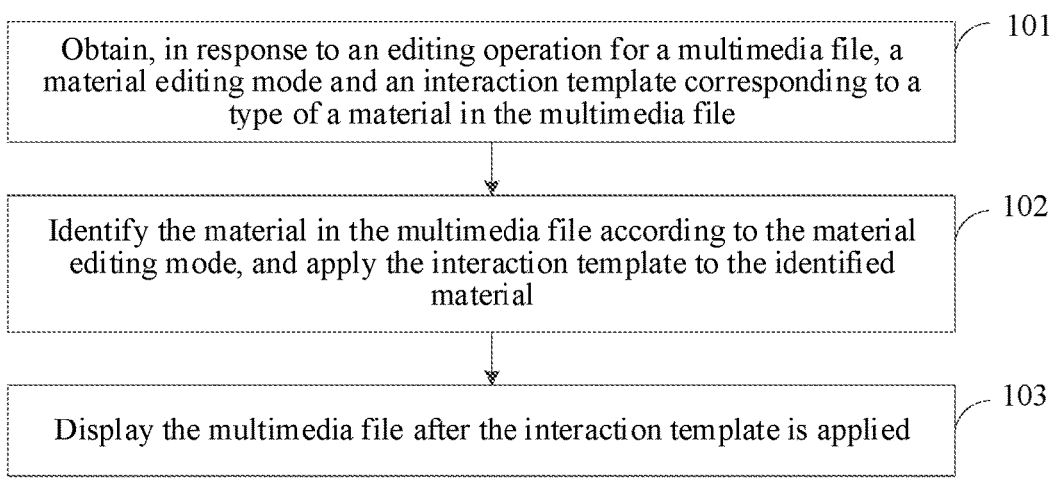

Obtain, in response to an editing operation for a multimedia file, a material editing mode and an interaction template corresponding to a type of a material in the multimedia file  — 101

Identify the material in the multimedia file according to the material editing mode, and apply the interaction template to the identified material  — 102

Display the multimedia file after the interaction template is applied  — 103

FIG. 3A

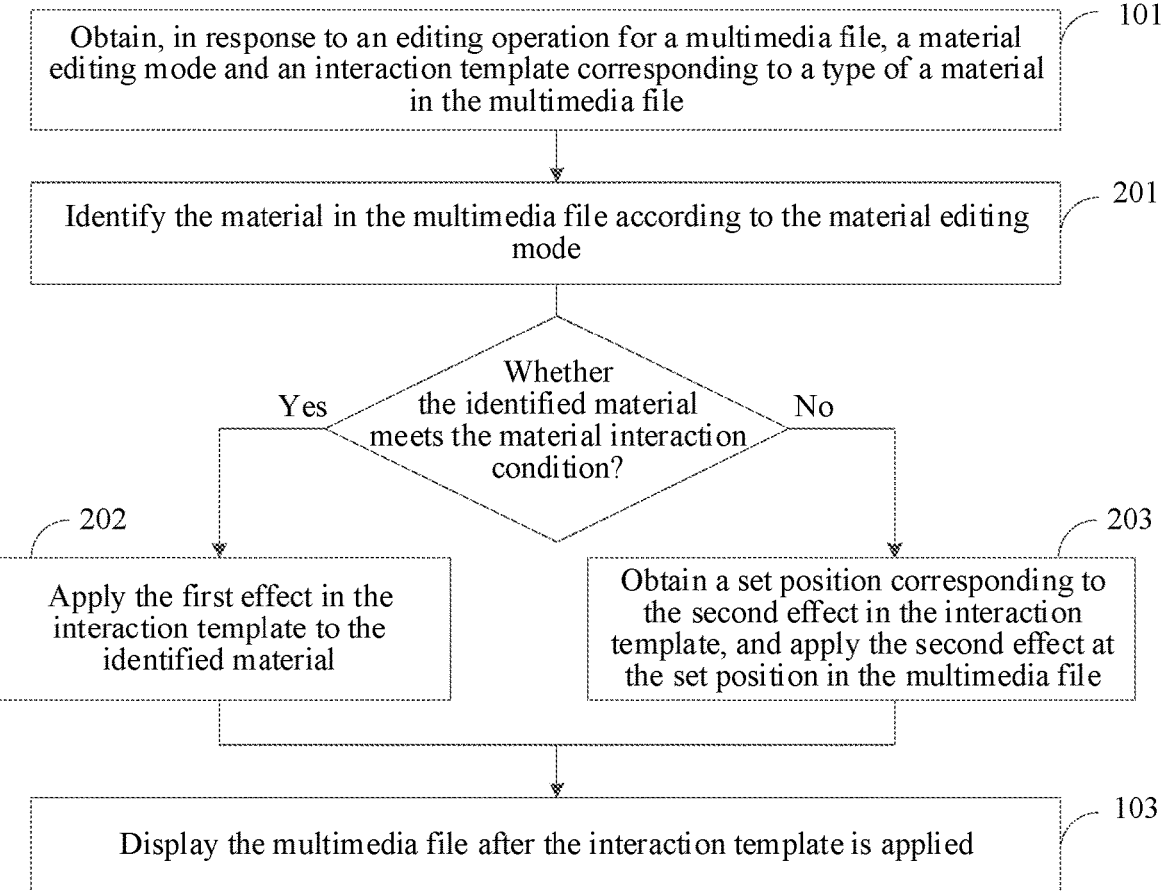

Obtain, in response to an editing operation for a multimedia file, a material editing mode and an interaction template corresponding to a type of a material in the multimedia file  — 101

Identify the material in the multimedia file according to the material editing mode  — 201

Whether the identified material meets the material interaction condition?

Yes  No

Apply the first effect in the interaction template to the identified material  — 202

Obtain a set position corresponding to the second effect in the interaction template, and apply the second effect at the set position in the multimedia file  — 203

Display the multimedia file after the interaction template is applied  — 103

FIG. 3B

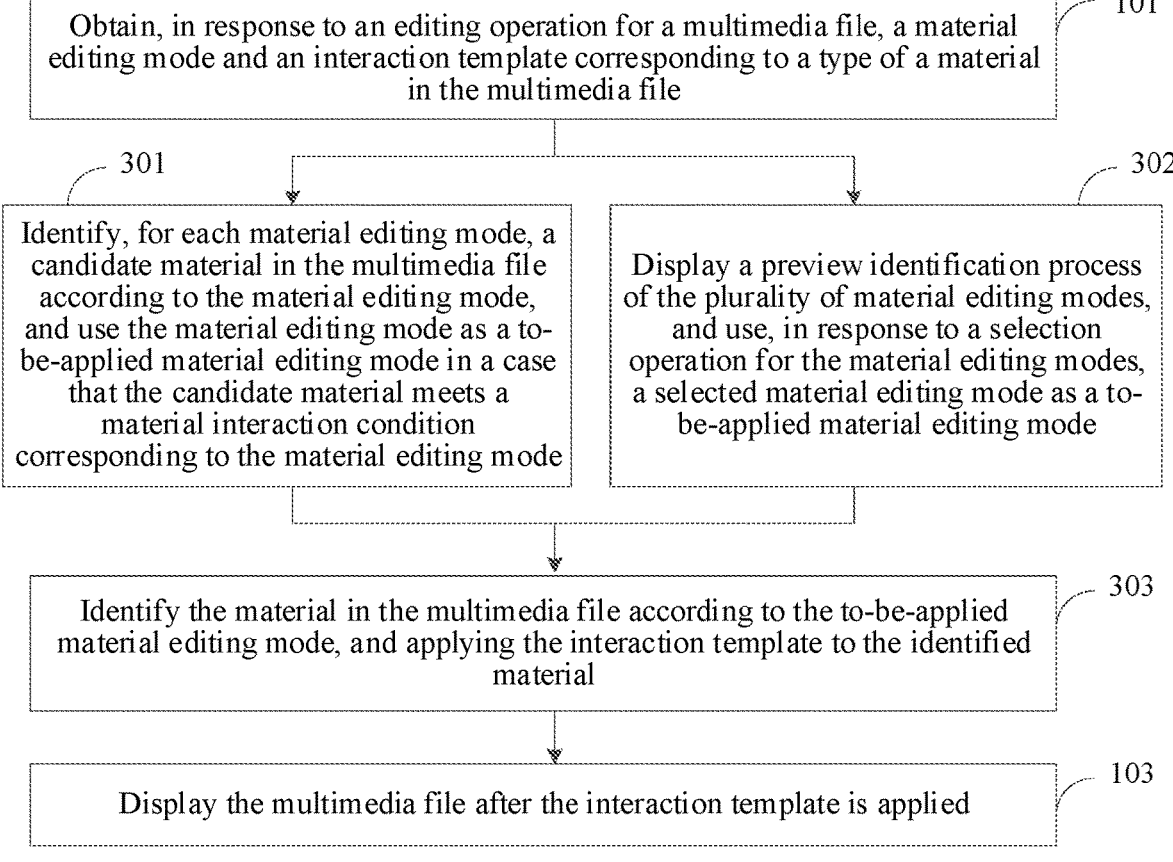

Obtain, in response to an editing operation for a multimedia file, a material editing mode and an interaction template corresponding to a type of a material in the multimedia file                                                                101

301

Identify, for each material editing mode, a candidate material in the multimedia file according to the material editing mode, and use the material editing mode as a to-be-applied material editing mode in a case that the candidate material meets a material interaction condition corresponding to the material editing mode

302

Display a preview identification process of the plurality of material editing modes, and use, in response to a selection operation for the material editing modes, a selected material editing mode as a to-be-applied material editing mode Identify the material in the multimedia file according to the to-be-applied material editing mode, and applying the interaction template to the identified material                                                                303

Display the multimedia file after the interaction template is applied                                                                103

FIG. 3C

Multimedia file 51 ◄───

Editing option 52 ◄───

Shooting option 53 ◄───

Multimedia file 71

Manual editing option 72

Flip

Filter

Beautify

More

Effect 711

Two-dimensional code pattern

Stall Clearance Sale

Magic

Music

| Available AI/AR capabilities |
|---|
| Intelligent editing<br>One-click to keep the essence of the video and add music |
| Intelligent filter<br>Automatically match suitable filters by identifying objects and corresponding scenes in the video |
| Stylized filter<br>Convert photos/videos to watercolors |
| Face fusion<br>Fuse the face of the user to the face of the template picture, gradient from face A to face B |
| Face parsing gradient<br>Picture transition based on key points of the face, so that a plurality of face pictures can be smoothly transitioned |
| 3D photo<br>Automatically generate pictures with 3D effects according to the uploaded pictures |
| Wild music<br>Click on different regions of the screen to trigger sound effects to match custom songs |
| One-click DJ<br>Update ordinary music to DJ version to match user status or speed changes |
| Face identification<br>Identify faces in videos or pictures, and return attribute information corresponding to faces |
| Micro-motion effect<br>Add a micro-motion effect to a specific region in the picture, to move slightly when triggered |
| Magic cutout<br>Identify people in pictures and cut them out to replace backgrounds |
| Pet lip movement<br>Enable the pet in the picture speak according to the entered text or audio |
| Text to speech (TTS)<br>According to the input text and the selected speaker, convert the text to the audio issued by the corresponding speaker |
| Cat face identification<br>Identify the cat in the picture and mark the key points of the cat's face |
| One-click sky change<br>Automatically identify sky regions in uploaded images and replace sky styles |

Capability 91 ←

FIG. 9

MULTIMEDIA PROCESSING METHOD AND APPARATUS BASED ON ARTIFICIAL INTELLIGENCE, AND ELECTRONIC DEVICE

CROSS-REFERENCES TO RELATED APPLICATIONS

This application is a continuation application of PCT Patent Application No. PCT/CN2021/102803, entitled "MULTIMEDIA PROCESSING METHOD AND APPARATUS BASED ON ARTIFICIAL INTELLIGENCE, AND ELECTRONIC DEVICE" and filed on Jun. 28, 2021, which claims priority to Chinese Patent Application No. 202010837810.8 filed on Aug. 19, 2020, the entire contents of both of which are incorporated herein by reference.

FIELD OF THE TECHNOLOGY

The present disclosure relates to the field of artificial intelligence and multimedia technologies, and in particular, to a multimedia processing method and apparatus based on artificial intelligence, an electronic device, and a computer-readable storage medium.

BACKGROUND OF THE APPLICATION

Artificial intelligence (AI) is a theory, method, technology, and application system in which a digital computer or a machine controlled by a digital computer is used for simulating, extending, and expanding human intelligence, sensing an environment, acquiring knowledge, and using the knowledge to obtain an optimal result. Computer vision (CV) technology is an important branch of artificial intelligence, and is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection.

Multimedia editing is an important application of computer vision. In the solutions provided in the related technologies, a user usually selects a material editing mode and uploads a multimedia file, and an electronic device edits the multimedia file according to the material editing mode. However, the material editing mode often has specific requirements for the multimedia file, which may easily lead to failure to edit the multimedia file uploaded by the user. The electronic device may perform invalid processing on the multimedia file, resulting in a waste of computing resources.

SUMMARY

The technical solutions in the embodiments of the present disclosure are implemented as follows:

An embodiment of the present disclosure provides a multimedia processing method, including: obtaining, in response to an editing operation for a multimedia file, a material editing mode and an interaction template corresponding to a type of a material in the multimedia file; identifying the material in the multimedia file according to the material editing mode, and applying the interaction template to the identified material; and displaying the multimedia file after the interaction template is applied.

An embodiment of the present disclosure provides a multimedia processing apparatus, including: an obtaining module, configured to obtain, in response to an editing operation for a multimedia file, a material editing mode and an interaction template corresponding to a type of a material in the multimedia file; an application module, configured to identify the material in the multimedia file according to the material editing mode, and apply the interaction template to the identified material; and an application completion module, configured to display the multimedia file after the interaction template is applied.

An embodiment of the present disclosure provides an electronic device, including: a memory, configured to store executable instructions; and a processor, configured to implement, when executing the executable instructions stored in the memory, the multimedia processing method provided in the embodiments of the present disclosure.

An embodiment of the present disclosure provides a non-transitory computer-readable storage medium, storing executable instructions, the executable instructions, when executed by a processor, implementing the multimedia processing method provided in the embodiments of the present disclosure.

BRIEF DESCRIPTION OF THE DRAWINGS

FIG. 3A is a schematic flowchart of a multimedia processing method based on artificial intelligence according to an embodiment of the present disclosure.

FIG. 3B is a schematic flowchart of a multimedia processing method based on artificial intelligence according to an embodiment of the present disclosure.

FIG. 3C is a schematic flowchart of a multimedia processing method based on artificial intelligence according to an embodiment of the present disclosure.

FIG. 9 is a schematic diagram of a material editing capability according to an embodiment of the present disclosure.

DESCRIPTION OF EMBODIMENTS

Figure 1:
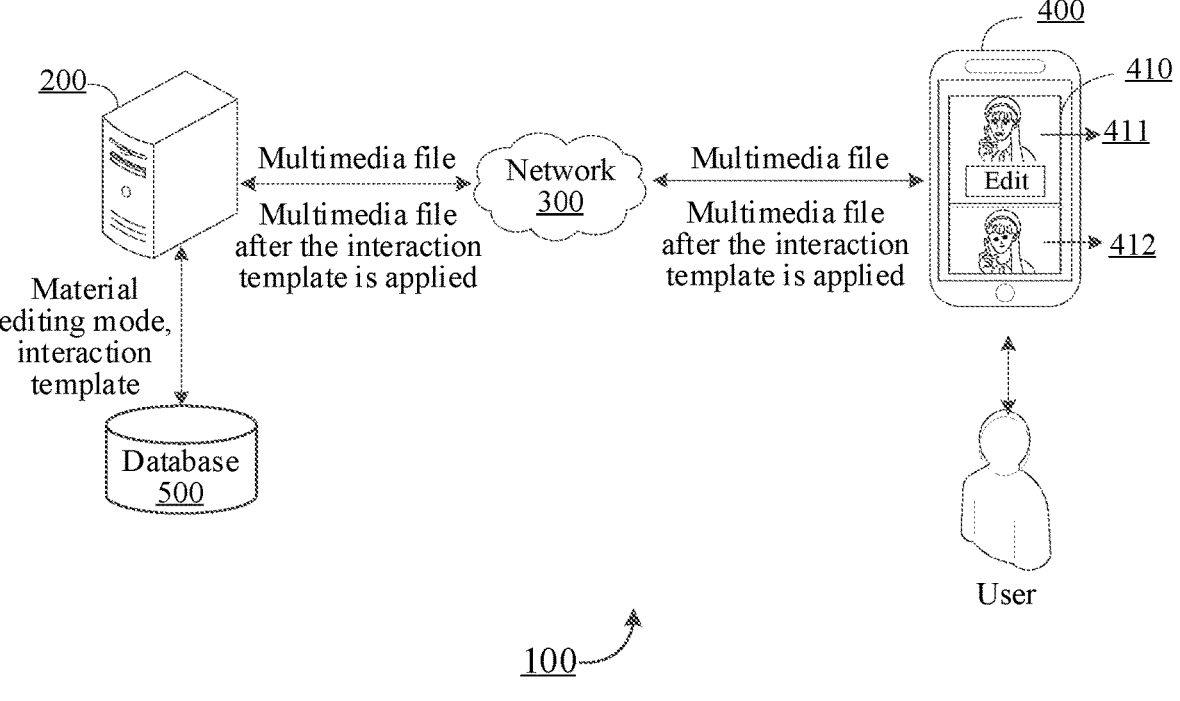
FIG. 1 is a schematic diagram of an architecture of a multimedia processing system based on artificial intelligence according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of the present disclosure described herein can be implemented in a sequence in addition to the sequence shown or described herein. In the following description, the term "plurality of" means at least two.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, terms involved in the embodiments of the present disclosure are described. The terms provided in the embodiments of the present disclosure are applicable to the following explanations.

1) Multimedia file: It refers to a file containing at least one form of media. For example, a multimedia file may be any one of a picture, audio, or a video.

2) Material: It refers to content (or referred to as object) in a multimedia file. For example, a type of material may be a face, a cat, a dog, or a sky.

3) Material editing mode: It is used for identifying a material in a multimedia file. A material editing mode is used for providing a material editing capability, that is, a capability of identifying materials, such as face identification capabilities or sky identification capabilities.

4) Interaction template: It includes interaction effects, which are applied to multimedia files to form material-based interaction effects. The specific representation form of the interaction effects is not limited in the embodiments of the present disclosure, and may be, for example, a picture, audio, animation, a special effect, or a speed change effect.

5) Artificial intelligence model: It is a model constructed based on the principle of artificial intelligence. The type of the artificial intelligence model is not limited in the embodiments of the present disclosure, and the artificial intelligence model may be, for example, a neural network model.

6) Virtual reality (VR): It uses data in real life, and combines electronic signals generated through computer technologies with various output devices to transform the signals into a simulated environment that can be felt by people. Effects created using the virtual reality technology are virtual reality effects.

7) Augmented reality (AR): It simulates and applies virtual information such as text, images, three-dimensional models, music, or videos generated by a computer to the real world. The virtual information and information in the real world complement each other, thereby realizing the enhancement of the real world. Effects created using the augmented reality technology are augmented reality effects.

8) Database: It is a data set that is stored together in a manner, can be shared with a plurality of users, has as little redundancy as possible, and is independent of an application program. A user can add, query, update, and delete data in the database.

The embodiments of the present disclosure provide a multimedia processing method and apparatus based on artificial intelligence, an electronic device, and a computer-readable storage medium, which can effectively edit multimedia files, improve the success rate of editing, and improve the utilization rate of computing resources consumed by the electronic device. An exemplary application of an electronic device provided in an embodiment of the present disclosure is described below. The electronic device provided in this embodiment of the present disclosure may be implemented as a terminal device or a server. By running a multimedia processing solution provided in the embodiments of the present disclosure, the electronic device can effectively edit multimedia files, improve the utilization rate of computing resources, that is, improve the editing performance of the electronic device, and is suitable for various editing scenarios.

FIG. 1 is a schematic diagram of an architecture of a multimedia processing system 100 based on artificial intelligence according to an embodiment of the present disclosure. A terminal device 400 is connected to a server 200 through a network 300, and the server 200 is connected to a database 500, where the network 300 may be a wide area network or a local area network, or a combination thereof.

In some embodiments, taking the electronic device being a terminal device as an example, the multimedia processing method based on artificial intelligence provided in the embodiments of the present disclosure may be implemented by the terminal device. For example, the terminal device 400 obtains, in response to receiving an editing operation for a multimedia file, a material editing mode and an interaction template corresponding to a type of a material in the multimedia file; identifies the material in the multimedia file according to the material editing mode, and applies the interaction template to the identified material. Finally, the terminal device 400 displays the multimedia file in a graphic interface 410 after the interaction template is applied. Various results (for example, multimedia files, material editing modes, and interaction templates) involved in the multimedia processing process may be pre-stored locally in the terminal device 400, or may be obtained by the terminal device 400 from the outside world (for example, the server 200, the database 500, or a blockchain), and the latter manner can reduce the storage resource occupation of the terminal device 400.

In some embodiments, taking the electronic device being a server as an example, the multimedia processing method based on artificial intelligence provided in the embodiments of the present disclosure may be alternatively implemented collaboratively by the server and the terminal device. For example, when receiving the editing operation for the multimedia file sent by the terminal device 400, the server 200 obtains the material editing mode and the interaction template corresponding to the type of the material in the multimedia file from the database 500. The server 200 may then identify the material in the multimedia file according to the material editing mode, apply the interaction template to the identified material, and send the multimedia file to which the interaction template is applied to the terminal device 400, so that the terminal device 400 displays the multimedia file to which the interaction template is applied in the graphic interface 410. Alternatively, the server 200 may send the material editing mode and the interaction template to the terminal device 400, so that the terminal device 400 locally identifies the material in the multimedia file according to the material editing mode, and applies the interaction template to the identified material. Material editing modes and interaction templates respectively corresponding to a plurality of types may be pre-stored locally in the terminal device 400. In this way, the server 200 may send only an identifier (or number) of the material editing mode and an identifier (or number) of the interaction template, and the terminal device 400 can call the corresponding material editing mode and interaction template locally for editing, which can reduce the consumption of communication resources. Various results (for example, multimedia files, material editing modes, and interaction templates) involved in the multimedia processing process may be pre-stored locally in a distributed file system of the server 200 or the database 500, or may be stored by the server 200 from the outside world (for example, a blockchain), and the latter manner can reduce the storage resource occupation of the server 200.

The terminal device 400 is configured to display various results involved in the multimedia processing process in the graphic interface 410. In FIG. 1, a to-be-edited multimedia file 411, an editing option for the multimedia file 411, and a multimedia file 412 after an interaction template is applied are exemplarily shown. When the editing option for the multimedia file 411 is triggered, it is determined that an editing operation for the multimedia file 411 is received. The applied interaction template includes a face for replacement, that is, the multimedia file 412 is obtained by replacing the face of the multimedia file 411.

In some embodiments, the terminal device 400 or the server 200 may implement the multimedia processing method based on artificial intelligence provided in the embodiments of the present disclosure by running a computer program. For example, the computer program may be a native program or software module in an operating system; may be a native application (APP), that is, an application that needs to be installed in the operating system to run; may be an applet, that is, an application that is executable only by downloading into the browser environment; or may be an applet that can be embedded in any APP. To sum up, the computer program may be any form of application, module or plug-in.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The cloud service may be a multimedia processing service, which is invoked by the terminal device 400 to edit the multimedia file sent by the terminal device 400, and send the multimedia file after the interaction template is applied to the terminal device 400. The terminal device 400 may be a smartphone, a tablet computer, a notebook computer, a desktop computer, a smart speaker, a smartwatch, or the like, but is not limited thereto. The terminal device and the server may be directly or indirectly connected in a wired or wireless communication manner. This is not limited in the embodiments of the present disclosure.

In some embodiments, the database 500 and the server 200 may be independently arranged. In some embodiments, the database 500 and the server 200 may be alternatively integrated, that is, the database 500 may be considered as existing inside the server 200 and integrated with the server 200. The server 200 can provide the data management function of the database 500.

Figure 2:
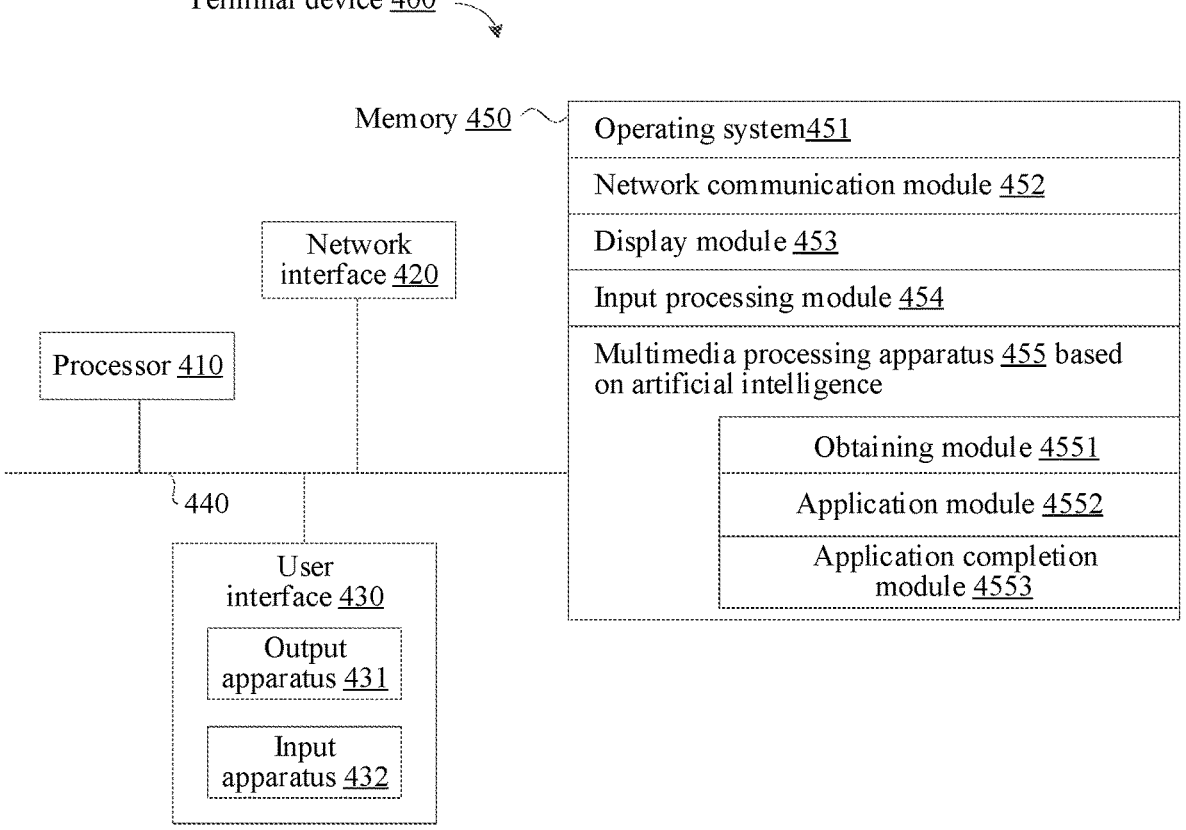
FIG. 2 is a schematic diagram of an architecture of a terminal device according to an embodiment of the present disclosure.

Taking the electronic device provided in the embodiments of the present disclosure being a terminal device as an example, it may be understood that, when the electronic device is a server, parts (for example, a user interface, a display module, and an input processing module) of the structure shown in FIG. 2 may be omitted. FIG. 2 is a schematic structural diagram of a terminal device 400 according to an embodiment of the present disclosure. The terminal device 400 shown in FIG. 2 includes at least one processor 410, a memory 450, at least one network interface 420, and a user interface 430. The components in the terminal device 400 are coupled by a bus system 440. It may be understood that the bus system 440 is configured to implement connection and communication between the components. In addition to a data bus, the bus system 440 further includes a power bus, a control bus, and a status signal bus. However, for ease of clear description, all types of buses are labeled as the bus system 440 in FIG. 2.

The processor 410 may be an integrated circuit chip having a signal processing capability, for example, a general purpose processor, a DSP, or another PLD, discrete gate, transistor logical device, or discrete hardware component. The general purpose processor may be a microprocessor, any conventional processor, or the like.

The user interface 430 includes one or more output apparatuses 431 that can display media content, including one or more speakers and/or one or more visual display screens. The user interface 430 further includes one or more input apparatuses 432, including user interface components that facilitate inputting of a user, such as a keyboard, a mouse, a microphone, a touch display screen, a camera, and other input button and control.

The memory 450 may be a removable memory, a non-removable memory, or a combination thereof. Exemplary hardware devices include a solid-state memory, a hard disk drive, an optical disc driver, or the like. The memory 450 may include one or more storage devices physically away from the processor 410.

The memory 450 includes a volatile memory or a non-volatile memory, or may include both a volatile memory and a non-volatile memory. The non-volatile memory may be a read-only memory (ROM). The volatile memory may be a random access memory (RAM). The memory 450 described in this embodiment of the present disclosure is to include any other suitable type of memories.

In some embodiments, the memory 450 may store data to support various operations. Examples of the data include a program, a module, and a data structure, or a subset or a superset thereof, which are described below by using examples.

An operating system 451 includes a system program configured to process various basic system services and perform a hardware-related task, such as a framework layer, a core library layer, or a driver layer, and is configured to implement various basic services and process a hardware-based task.

A network communication module 452 is configured to reach another electronic device through one or more (wired or wireless) network interfaces 420. Exemplary network interfaces 420 include: Bluetooth, wireless compatible authentication (Wi-Fi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the multimedia processing apparatus based on artificial intelligence provided in the embodiments of the present disclosure may be implemented by using software. FIG. 2 shows a multimedia processing apparatus based on artificial intelligence 455 stored in the memory 450. The apparatus may be software in the form such as a program and a plug-in, and includes the following software modules: an obtaining module 4551, an application module 4552, and an application completion module 4553. These modules are logical modules, and may be combined in different manners or further divided based on a function to be performed. The following describes functions of the modules.

In some other embodiments, the multimedia processing apparatus based on artificial intelligence provided in the embodiments of the present disclosure may be implemented by using hardware. For example, the multimedia processing apparatus based on artificial intelligence provided in the embodiments of the present disclosure may be a processor in the form of a hardware decoding processor, programmed to perform the multimedia processing method based on artificial intelligence provided in the embodiments of the present disclosure. For example, the processor in the form of a hardware decoding processor may use one or more application-specific integrated circuits (ASIC), a DSP, a PLD, a complex programmable logic device (CPLD), a field-programmable gate array (FPGA), or another electronic element.

The multimedia processing method based on artificial intelligence provided in the embodiments of the present disclosure is described with reference to an exemplary application and implementation of the electronic device provided in this embodiment of the present disclosure.

FIG. 3A is a schematic flowchart of a multimedia processing method based on artificial intelligence according to an embodiment of the present disclosure. A description is made with reference to steps shown in FIG. 3A.

Step 101: Obtain, in response to an editing operation for a multimedia file, a material editing mode and an interaction template corresponding to a type of a material in the multimedia file.

The multimedia file may be pre-stored locally in the electronic device, or obtained by the electronic device from the outside world (for example, the Internet), or acquired in real time by the electronic device, for example, acquired through a camera and/or microphone of the electronic device. When detecting (or referred to as receiving) the editing operation for the multimedia file, the electronic device obtains the material editing mode and the interaction template corresponding to the type of the material in the multimedia file. The type of the editing operation is not limited in the embodiments of the present disclosure, and may be, for example, a contact operation (for example, a click operation or a touch and hold operation), or a noncontact operation (for example, a gesture operation or a voice input operation). For example, the electronic device may display an editing option for the multimedia file on a graphic interface, and use a trigger operation (for example, a click operation or a touch and hold operation) for the editing option as the editing operation for the multimedia file.

The electronic device obtains, in response to the editing operation for the multimedia file, the material editing mode and the interaction template corresponding to the type of the material in the multimedia file, where the type of the material in the multimedia file may be obtained directly, such as inputted by the user, or may be obtained by performing material identification processing on the multimedia file. For example, it is preset that a material editing mode corresponding to a face type includes a face identification capability (for example, the face identification capability is realized through a face identification model), and a corresponding interaction template includes face special effects, such as special effects of decorating facial features of a face; and a material editing mode corresponding to a sky type includes a sky identification capability, and a corresponding interaction template includes pictures used for replacing the sky. In this way, a material editing mode and an interaction template can be componentized to reduce the degree of coupling between the two, and the degree of freedom can also be improved for the creation process of the material editing mode and the interaction template.

The multimedia file may include various types of materials. For example, a picture includes both a face and a sky. Therefore, in step 101, a plurality of material editing modes and a plurality of interaction templates may be obtained.

In some embodiments, the obtaining of the material editing mode and the interaction template corresponding to the type of the material in the multimedia file may be implemented in the following manner: obtaining, in candidate material editing modes respectively corresponding to a plurality of types, the material editing mode corresponding to the type of the material in the multimedia file, and obtaining at least one interaction template corresponding to the material editing mode.

In this embodiment of the present disclosure, for a plurality of types of materials, corresponding material editing modes (named as candidate material editing modes for the convenience of distinction) may be set respectively, and at least one interaction template corresponding to each candidate material editing mode may be set. For example, it is set that the face type corresponds to a candidate material editing mode including the face identification capability, the candidate material editing mode corresponds to an interaction template A and an interaction template B, and the interaction templates A and B include different styles of face special effects. It is set that the sky type corresponds to a candidate material editing mode including the sky identification capability, and the candidate material editing mode corresponds to an interaction template C and an interaction template D, where the interaction template C includes a starry sky picture for replacing the sky, and the interaction template D includes a waterfall picture for replacing the sky. In this way, after the type of the material in the multimedia file is obtained, the material editing mode corresponding to the type is obtained among the plurality of candidate material editing modes, and at least one interaction template corresponding to the material editing mode is further obtained. Through the foregoing manner, the ordering of the obtaining operation can be improved, and it is convenient to obtain the accurate material editing mode and interaction template.

Step 102: Identify the material in the multimedia file according to the material editing mode, and apply the interaction template to the identified material.

The material is identified in the multimedia file according to the obtained material editing mode, and the obtained interaction template is applied to the identified material. For example, based on the identified material, a special effect in the interaction template is added. In another example, the identified material is replaced with a picture in the interaction template. The application of the interaction template is not limited thereto, and may be set according to actual application scenarios.

In some embodiments, after the identifying the material in the multimedia file according to the material editing mode, the method further includes: displaying a confirmation prompt corresponding to the identified material, where the confirmation prompt includes at least one of the type of the identified material, location information of the identified material in the multimedia file, or a preview result obtained after the interaction template is applied to the identified material; and the applying the interaction template to the identified material may be implemented in the following manner: applying the interaction template to the identified material in response to a confirmation operation for the confirmation prompt.

After the material in the multimedia file is identified, the confirmation prompt corresponding to the identified material may be displayed in the graphic interface of the electronic device. In this embodiment of the present disclosure, the confirmation prompt may include at least one of the type of the identified material, location information of the identified material in the multimedia file, or a preview result obtained after the interaction template is applied to the identified material. According to different actual application scenarios, the confirmation prompt may include more or less content.

The location information of the material in the multimedia file may be time location information, or region location information of the material in a video frame or a picture. In an example where the multimedia file is video and the type of the material is a face, the location information may be a timestamp of a video frame including the face in the video, or may be a specific region occupied by the face in the video frame including the face. In addition, the preview result obtained after the interaction template is applied may be obtained by applying the interaction template to at least some of the materials identified in the multimedia file. For example, the interaction template is applied to any video frame (for example, the first video frame) that includes the face in the video to obtain a preview result.

The User may quickly and accurately determine whether to apply the interaction template through the confirmation prompt. When receiving a confirmation operation for the confirmation prompt, the electronic device applies the interaction template to the identified material; and when receiving a denial operation for the confirmation prompt, the electronic device suspends editing of the multimedia file. In this way, whether to apply the interaction template is determined through human-computer interaction, which can reduce the waste of computing resources.

Certainly, the role of the confirmation prompt is not limited thereto. For example, when the obtained material editing mode includes a violating content identification capability, a confirmation prompt corresponding to the identified material may be displayed, where the confirmation prompt includes a type of the identified material (that is violating content) and location information of the material in the multimedia file, to prompt the existence of the violating content in the multimedia file. The violating content is, for example, a watermark. The user may manually modify content in the multimedia file according to a confirmation prompt, or the electronic device may alternatively apply an interaction template to an identified material when receiving a confirmation operation for the confirmation prompt. The interaction template is configured to block violating content, which includes, for example, mosaics used to cover the violating content.

In some embodiments, the interaction template includes an interaction effect and a duration of the interaction effect; and the applying the interaction template to the identified material may be implemented in the following manner: applying the interaction effect in the interaction template to the identified material and maintaining the applied interaction effect until the duration is reached.

For example, the multimedia file is a video with a total length of 10 seconds, the type of the material in the video is a face, and time location information of the face in the video includes the $3^{rd}$ second, the $3.5^{th}$ second, the $4^{th}$ second, the $7^{th}$ second, the $7.5^{th}$ second, and the $8^{th}$ second, and the obtained interaction template includes an interaction effect of a face special effect and a duration of 1 second. The face special effect in the interaction template is added to a video frame (a video frame at the $3^{rd}$ second) in which the face first appears in the video. face special effects, and the added face special effect remains unchanged until the duration reaches 1 second. After 1 second is reached, the face special effect is added to a next video frame (a video frame at the $7^{th}$ second) in which the face appears, and the added face special effect remains unchanged until the duration reaches 1 second, and so on. In this way, the applied interaction effect can be reused, thereby reducing the processing resource consumption caused by the frequent application of the interaction effect.

In another example, the multimedia file is a picture, the type of the material in the picture is a face, and the obtained interaction template includes an interaction effect of a face special effect and a duration of 5 seconds. The face special effect in the interaction template is added based on the face included in the picture, and the added face special effect remains unchanged until the duration reaches 5 seconds to generate a video, where each video frame in the video is a picture with the face special effect added. In this way, another reuse of the interaction effect is achieved.

Since the interaction effect included in the interaction template supports componentization, when an interaction template is created, the existing interaction effect can be reused, which improves the degree of freedom and efficiency of creating the interaction template.

In some embodiments, after the identifying the material in the multimedia file according to the material editing mode, the method further includes: cropping the multimedia file according to location information of the identified material in the multimedia file.

Similarly, the location information herein may be time location information, or may be region location information of the material in a video frame or a picture. If the location information is time location information, the multimedia file may be cropped according to the first timestamp (that is, the earliest timestamp) and the last timestamp (that is, the latest timestamp) in the time location information of the material. For example, the multimedia file is a video with a total length of 30 seconds, and the time location information of the identified material in the multimedia file includes the $5^{th}$ second, the $7^{th}$ second, and the $10^{th}$ second. The multimedia file is cropped based on time, that is, a part in the multimedia file from the $5^{th}$ second to the $10^{th}$ second is cropped. If the location information is region location information, the multimedia file may be cropped based on region according to the region location information. For example, if the multimedia file is a picture, and region location information of an identified material in the picture is the left half, the left half of the picture is cropped.

After the cropping, the interaction template may be applied to the identified material in the cropped multimedia file. Through the foregoing manner, the most important part of the multimedia file may be cropped according to the identified material, the intelligence of multimedia editing can be improved, and it is suitable for scenarios such as making free point videos.

Step 103: Display the multimedia file after the interaction template is applied.

The multimedia file after the interaction template is applied may be displayed in the graphic interface, for example, a picture after the interaction template is applied is displayed, or a video or audio after the interaction template is applied is played. Based on this, an option of manual editing may be further displayed, so that the user can manually edit the multimedia file after the interaction template is applied, such as manually cropping the multimedia file, or manually adding effects such as text, stickers, special effects, or music.

As shown in FIG. 3A, according to this embodiment of the present disclosure, the material editing mode and the interaction template corresponding to the type of the material in the multimedia file are obtained, which can reduce the threshold of selecting the multimedia file, improve the success rate of multimedia editing, and improve the utilization rate of computing resources consumed by the electronic device during the processing.

In some embodiments, FIG. 3B is a schematic flowchart of a multimedia processing method based on artificial intelligence according to an embodiment of the present disclosure. Step 102 shown in FIG. 3A may be implemented through steps 201 and 202, and a description is made with reference to the steps.

Step 201: Identify the material in the multimedia file according to the material editing mode.

Step 202: Apply the first effect in the interaction template to the identified material when the identified material meets a material interaction condition corresponding to the material editing mode.

In this embodiment of the present disclosure, the interaction template is configured to form interaction effects that are based on the material, the interaction effects include a first effect and a second effect different from the first effect, and the first effect includes at least one of an augmented reality effect or a virtual reality effect. Alternatively, an effect directly applied to the material may be used as a first effect, and an effect other than the first effect may be used as a second effect, regardless of the expression form thereof. In this embodiment of the present disclosure, quantities of the first effect and the second effect included in the interaction template are not limited.

After the material is identified in the multimedia file according to the obtained material editing mode, the identified material is compared with the material interaction condition corresponding to the material editing mode, where the material interaction condition corresponding to the material editing mode may be preset. For example, if the multimedia file is a picture, and the material interaction condition includes an area ratio threshold of a specific type of material, when an area ratio of this type of material in the picture is greater than the area ratio threshold, it is determined that the material interaction condition is met.

The first effect is applied to the identified material when the identified material meets the material interaction condition. For example, when the first effect is an animation special effect of a face, the identified material (that is, the face) is converted through the animation special effect to obtain an animation face, thereby forming a virtual reality sensory effect. In another example, when the first effect is a stall special effect, the stall special effect may be superimposed and displayed in a region (for example, the ground) of the identified material, to form an augmented reality sensory effect of setting up the stall in the real world.

In FIG. 3B, after step 201, step 203 may include: obtaining, when the identified material does not meet the material interaction condition, a set position corresponding to the second effect in the interaction template, and applying the second effect at the set position in the multimedia file.

When the identified material does not meet the material interaction condition, for example, the area ratio of the material is less than or equal to the area ratio threshold, the identified material is not suitable for direct application of the effect. Therefore, the set position corresponding to the second effect is obtained, and the second effect in the interaction template is applied at the set position in the multimedia file. The set position is not limited in this embodiment of the present disclosure, and may be specifically set according to the actual application scenario. In addition, the set position corresponding to the second effect may be included in the interaction template, and certainly, may be alternatively stored in other places.

For example, if the multimedia file is a picture, the type of the material in the picture is a face, the second effect included in the obtained interaction template is text that "face is about to appear", and the set position included is the center of the picture, when the identified material does not meet the material interaction condition, the text that "face is about to appear" is displayed in the center of the picture.

When the multimedia file is a video, whether the identified material meets the material interaction condition may be determined by using video frame as a unit. When a material identified in a video frame meets the material interaction condition, the first effect is applied to the material identified in the video frame; and when a material identified in a video frame does not meet the material interaction condition, the second effect is applied at the set position in the video frame.

In some embodiments, the identifying the material in the multimedia file according to the material editing mode may be implemented in the following manner: identifying the material in the multimedia file according to the material editing mode when an editing scenario is the non-real-time scenario, to obtain a matching degree between the material and the multimedia file, and determining that the identified material meets the first material interaction condition when the matching degree is greater than a matching degree threshold in a first material interaction condition corresponding to the material editing mode; or compressing the multimedia file when an editing scenario is the real-time scenario, and identifying the material in the compressed multimedia file according to the material editing mode, to obtain a matching degree between the material and the compressed multimedia file, and determining that the identified material meets the second material interaction condition when the matching degree is greater than a matching degree threshold in a second material interaction condition corresponding to the material editing mode, where the matching degree threshold in the first material interaction condition is greater than the matching degree threshold in the second material interaction condition.

In this embodiment of the present disclosure, editing scenarios may be divided into non-real-time scenarios with lower real-time requirements and real-time scenarios with higher real-time requirements. For example, a scenario in which the multimedia file is a picture is determined as a non-real-time scenario, and a scenario in which the multimedia file is a video is determined as a real-time scenario. In another example, a scenario in which the multimedia file is pre-stored locally in the electronic device is determined as a non-real-time scenario, and a scenario in which the multimedia file is acquired in real time or obtained from the outside world in real time is determined as a real-time scenario. In addition, for each material editing model, a first material interaction condition applicable to a non-real-time scenario and a second material interaction condition applicable to a real-time scenario may be preset for the material editing mode.

The material is identified in the to-be-edited multimedia file (that is, the original multimedia file) according to the obtained material editing mode when the editing scenario is the non-real-time scenario, to obtain the matching degree between the material and the multimedia file. The obtained matching degree is then compared with the matching degree threshold in the first material interaction condition corresponding to the material editing mode, and it is determined that the identified material meets the first material interaction condition when the matching degree is greater than the matching degree threshold. For example, the matching degree between the material and the multimedia file may be the area ratio of the material in the multimedia file, and the matching degree threshold may be the area ratio threshold.

When the editing scenario is the real-time scenario, due to high requirements for real-time editing, the multimedia file is compressed, and the material is identified in the compressed multimedia file according to the material editing mode, to obtain the matching degree between the material and the compressed multimedia file. The compressing the multimedia file may be to reduce the size of the multimedia file to a set size. The set size may be set according to the processing time and identification accuracy of the material editing mode. Different material editing modes may correspond to different set sizes. It is determined that the identified material meets the second material interaction condition when the obtained matching degree is greater than the matching degree threshold in the second material interaction condition corresponding to the material editing mode, where the matching degree threshold in the first material interaction condition is greater than the matching degree threshold in the second material interaction condition. Through compression processing, the efficiency of identifying the material according to the material editing mode can be improved, and the real-time requirements can be met. In addition, considering that the accuracy of identifying the material may be reduced after the compression processing, it is set that the matching degree threshold in the second material interaction condition is smaller than the matching degree threshold in the first material interaction condition, to conform to the characteristics of compression processing.

As shown in FIG. 3B, according to this embodiment of the present disclosure, different effects are applied according to whether the identified material meets the corresponding material interaction condition, which improves the applicability to different identification situations. When the multimedia file is a video, the continuity and integrity of the applied effect can be guaranteed.

In some embodiments, referring to FIG. 3C, FIG. 3C is a schematic flowchart of a multimedia processing method based on artificial intelligence according to an embodiment of the present disclosure. Based on FIG. 3A, after step 101, step 301 may include: identifying, for each material editing mode, a candidate material in the multimedia file according to the material editing mode, and using a candidate material editing mode as the material editing mode to be applied when the candidate material meets a material interaction condition corresponding to the material editing mode.

When there are a plurality of obtained material editing modes, the plurality of material editing modes may be screened. For example, for each material editing mode, identification is performed in the multimedia file according to the material editing mode, and for the convenience of distinction, a material identified herein is named as a candidate material. When a candidate material obtained according to a material editing mode meets a material interaction condition corresponding to the material editing mode, the material editing mode is used as a to-be-applied material editing mode. In this way, the intelligent selection of the material editing mode can be realized, so that the to-be-applied material editing mode can be consistent with the material in the multimedia file.

In FIG. 3C, after step 101, step 302 may include: displaying a preview identification process of the plurality of material editing modes, and using, in response to a selection operation for the material editing modes, a selected material editing mode as a to-be-applied material editing mode.

This embodiment of the present disclosure further provides another manner of screening a plurality of material editing modes: displaying a preview identification process of the plurality of material editing modes in the graphic interface, and using, in response to a selection operation for the material editing modes, a selected material editing mode as a to-be-applied material editing mode. A preview identification process of identifying a sample multimedia file according to a material editing mode may be displayed, and a preview identification process of identifying a to-be-edited multimedia file according to a material editing mode may also be displayed. For a case that the sample multimedia file or the multimedia file is a video, a preview identification process of identifying one or several video frames of the video may be displayed.

The preview identification process may include results before and after the identification. Taking a case that the material editing mode includes the face identification capability and the sample multimedia file is a sample picture as an example, the shown preview identification process may include the original sample picture and a sample picture including an identified face position (for example, the face position is highlighted in the form of a dotted line). In addition to the display of the preview identification process, in this embodiment of the present disclosure, other information related to the material editing mode may be further shown, for example, a name of the material editing mode may be displayed, such as a face identification mode and a sky identification mode. In this way, the material editing mode is screened through human-computer interaction, so that the to-be-applied material editing mode can meet the actual needs of the user. According to different actual application scenarios, any one of steps 301 or 302 may be applied to screen the material editing mode.

In addition to the foregoing two manners, any one of a plurality of material editing modes (for example, the first material editing mode) may be alternatively used as the to-be-applied material editing mode. After the to-be-applied material editing mode is determined, other material editing modes may be further displayed in the graphic interface for the user to switch.

In FIG. 3C, step 102 shown in FIG. 3A may be updated to step 303, and step 303 includes: identifying the material in the multimedia file according to the to-be-applied material editing mode, and applying the interaction template to the identified material.

In some embodiments, the identifying a candidate material in the multimedia file according to the material editing mode may be implemented in the following manner: performing, when the multimedia file is a video, periodic frame extraction on the multimedia file to obtain candidate video frames; and identifying the candidate material in the candidate video frames according to the material editing mode; and the identifying the material in the multimedia file according to the to-be-applied material editing mode may be implemented in the following manner: identify the material in video frames (e.g., the candidate video frames) of the multimedia file according to the to-be-applied material editing mode.

When the multimedia file is a video, periodic frame extraction may be performed on the multimedia file, to finally obtain a plurality of candidate video frames. For example, a frame extraction frequency is 1 time every 2 seconds. The candidate material is then identified in the candidate video frames according to the material editing mode, so that the processing pressure can be reduced and the real-time performance can be improved when the material editing mode is screened. Based on this, the plurality of candidate video frames may be compressed when storage space occupied by the plurality of obtained candidate video frames is greater than a storage space threshold, and identification is performed in the compressed candidate video frames according to the material editing mode, thereby further improving the real-time performance.

After the candidate material is obtained, it may be set that when all candidate materials in the candidate video frames meet the material interaction condition corresponding to the material editing mode, the material editing mode may be used as the to-be-applied material editing mode; or it may be set that when candidate materials in a set quantity or a set ratio of candidate video frames meet the material interaction condition corresponding to the material editing mode, the material editing mode is used as the to-be-applied material editing mode.

After the to-be-applied material editing mode is screened, since the multimedia file is a video, the material is identified in each video frame of the multimedia file according to the to-be-applied material editing mode. Similarly, each video frame of the multimedia file may be compressed herein, and the material may be identified in each compressed video frame to meet the real-time requirements. Through the foregoing manner, when the multimedia file is a video, the processing pressure of screening the material editing mode can be reduced, so that the to-be-applied material editing mode can be quickly determined.

As shown in FIG. 3C, when there are a plurality of obtained material editing modes, an embodiment of the present disclosure provides two screening manners of intelligent selection and human-computer interaction selection, which improves the flexibility and accuracy of screening.

Figure 3D:
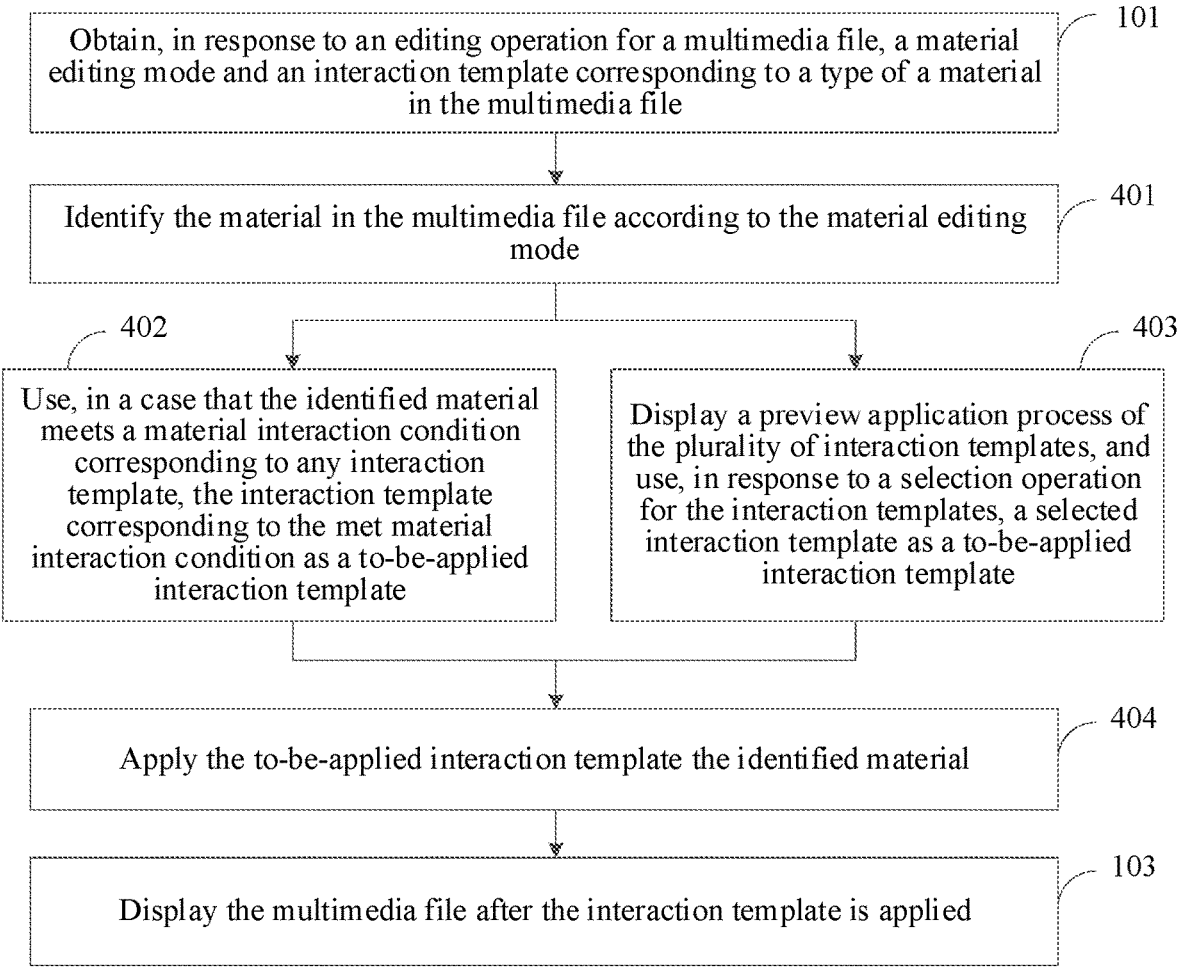
FIG. 3D is a schematic flowchart of a multimedia processing method based on artificial intelligence according to an embodiment of the present disclosure.

In some embodiments, FIG. 3D is a schematic flowchart of a multimedia processing method based on artificial intelligence according to an embodiment of the present disclosure. Step 102 shown in FIG. 3A may be implemented through steps 401 to 404.

Step 401: Identify the material in the multimedia file according to the material editing mode.

Step 402: Use, when the identified material meets a material interaction condition corresponding to any interaction template, the interaction template corresponding to the met material interaction condition as a to-be-applied interaction template.

When there are a plurality of obtained interaction templates, the plurality of interaction templates may be screened. For example, a material interaction condition corresponding to each interaction template is obtained, and when the material identified according to the material editing mode meets a material interaction condition corresponding to any interaction template, the interaction template corresponding to the met material interaction condition is used as a to-be-applied interaction template.

For example, an interaction template corresponding to a specific type of material includes a first interaction template and a second interaction template, the first interaction template includes both a first effect and a second effect, the second interaction template includes only the second effect, and the first interaction template and the second interaction template correspond to different material interaction conditions. If the material identified in the multimedia file meets a material interaction condition corresponding to the first interaction template, the first interaction template is used as a to-be-applied interaction template. Based on this, if there are a plurality of first interaction templates, and the plurality of first interaction templates correspond to the same material interaction condition, a plurality of to-be-applied interaction templates may be obtained. In this case, any one of the plurality of first interaction templates may be applied, and the other first interaction templates are displayed in the graphic interface for the user to switch. This manner is also applicable to other cases in which there are a plurality of to-be-applied interaction templates.

When the multimedia file is a video, the material used for comparison with the material interaction condition in step 402 may be a material identified in the candidate video frames (obtained through periodic frame extraction) of the multimedia file. In this way, the efficiency of screen the interaction template can be improved.

Step 403: Display a preview application process of the plurality of interaction templates, and use, in response to a selection operation for the interaction templates, a selected interaction template as a to-be-applied interaction template.

In addition to the manner shown in step 402, in this embodiment of the present disclosure, a preview application process of the plurality of interaction templates may be alternatively displayed, and in response to a selection operation for the interaction templates, a selected interaction template is used as a to-be-applied interaction template. A preview application process of applying the interaction template in the sample multimedia file may be displayed, and a preview application process of applying the interaction template in the to-be-edited multimedia file may also be displayed. For a case that the sample multimedia file or the multimedia file is a video, a preview application process of one or several video frames of the video may be displayed. The preview application process may include results before and after the application. Taking a case that the interaction template includes a starry sky picture and the sample multimedia file is a sample picture including a face and a background as an example, the shown preview application process may include the original sample picture, and a sample picture that replaces the background with the starry sky picture. In addition to displaying the preview application process, in this embodiment of the present disclosure, other information related to the interaction template may be further displayed, for example, a name of the displayed interaction template, such as a starry sky background template and a face special effect template. According to different actual application scenarios, any one of steps 402 or 403 may be applied to screen the interaction template.

In addition to the foregoing two manners, any one of the plurality of interaction templates (for example, the first interaction template) may be alternatively directly used as the to-be-applied interaction template. After the to-be-applied interaction template is determined, other interaction templates may be displayed in the graphic interface for the user to switch.

Step 404: Apply the to-be-applied interaction template the identified material.

As shown in FIG. 3D, when there are a plurality of obtained interaction templates, an embodiment of the present disclosure further provides two screening manners of intelligent selection and human-computer interaction selection, which improves the flexibility and accuracy of screening.

Figure 3E:
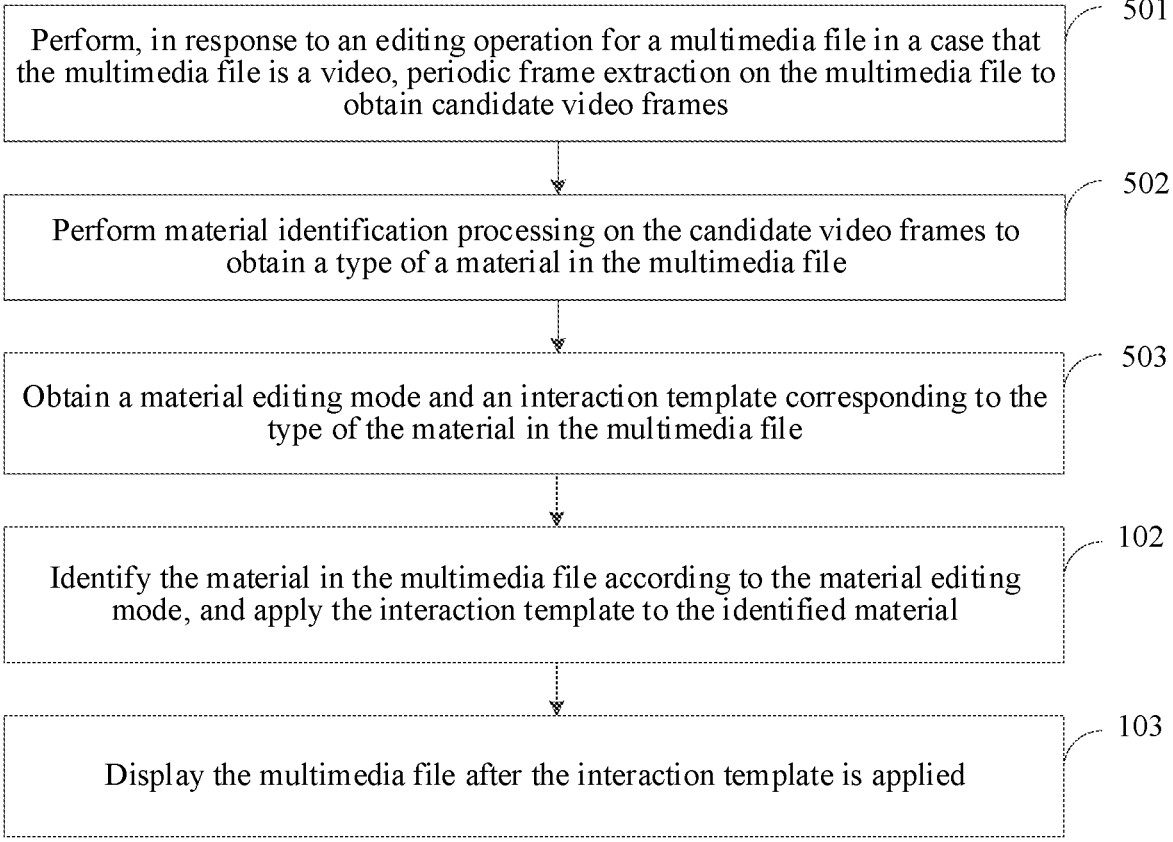
FIG. 3E is a schematic flowchart of a multimedia processing method based on artificial intelligence according to an embodiment of the present disclosure.

In some embodiments, FIG. 3E is a schematic flowchart of a multimedia processing method based on artificial intelligence according to an embodiment of the present disclosure. Step 101 shown in FIG. 3A may be implemented through steps 501 to 503, and a description is made with reference to the steps.

Step 501: Perform, in response to an editing operation for a multimedia file when the multimedia file is a video, periodic frame extraction on the multimedia file to obtain candidate video frames.

When the to-be-edited multimedia file is a video, in order to ensure the real-time performance of multimedia editing, frame extraction is performed on the multimedia file according to a set frame extraction frequency to obtain a plurality of candidate video frames.

Step 502: Perform material identification processing on the candidate video frames to obtain a type of a material in the multimedia file.

The performing material identification processing on the candidate video frames is to perform multi-classification processing, to obtain the type of the material in the multimedia file.

In some embodiments, after step 502, the method further includes: compressing the plurality of candidate video frames when storage space occupied by the plurality of candidate video frames is greater than a storage space threshold. The performing material identification processing on the candidate video frames to obtain a type of a material in the multimedia file may be implemented in the following manner: respectively performing material identification processing on the plurality of compressed candidate video frames, to obtain a type of a material in each candidate video frame, and using a type of a material with a largest ratio in the plurality of candidate video frames as the type of the material used for obtaining the corresponding material editing mode in the multimedia file, where the ratio includes any one of an area ratio or a quantity ratio of the material.

After frame extraction is performed to obtain the plurality of candidate video frames, if the storage space occupied by the plurality of candidate video frames is greater than the set storage space threshold, in order to ensure the real-time performance, the plurality of candidate video frames may be compressed. The set size during the compressing may be specifically set according to the actual application scenario. Material identification processing is then performed on the compressed candidate video frames respectively to obtain a type of a material in each candidate video frame. If the plurality of candidate video frames include different types, one type may be screened as a type of the obtained corresponding material editing mode.

The embodiments of the present disclosure provide two manners for screening the type. The first manner is to screen a type of a material with the largest area ratio among the plurality of candidate video frames. For example, the candidate video frames obtained by frame extraction include video frame 1, video frame 2, and video frame 3. Area ratios of a face and a sky in video frame 1 are 80% and 20% respectively, area ratios of the face and the sky in video frame 2 are 70% and 30% respectively, and area ratios of the face and the sky in video frame 3 are 75% and 25% respectively. It may be calculated that an average area ratio of the face is 75%, and an average area ratio of the sky is 25%. The face with the larger average area ratio is used as the screened type. This manner is also applicable to a case that the multimedia file is a picture.

The second manner is to screen a type of a material with the largest quantity ratio among the plurality of candidate video frames. For example, the candidate video frames obtained by frame extraction include video frame 1, video frame 2, and video frame 3. Both video frame 1 and video frame 2 includes a face, and video frame 3 includes both the face and a sky. It may be obtained that a quantity ratio of the face in the plurality of candidate video frames is 100%, and a quantity ratio of the sky is 1/3. Therefore, the face with the larger quantity ratio is used as the screened type. The type of the material is effectively screened through the foregoing manner.

In this embodiment of the present disclosure, type screening may not be performed, but instead, the corresponding material editing mode and interaction template may be obtained directly according to a type of a material in each candidate video frame. When there are a plurality of obtained material editing modes or interaction templates, screening is further performed.

In some embodiments, after step 502, the method further includes: obtaining a plurality of sample multimedia files; performing material identification processing on the sample multimedia files by using an artificial intelligence model, to obtain types of materials in the sample multimedia files; and updating a weight parameter of the artificial intelligence model according to differences between the types obtained through the material identification processing and actual types, where the updated artificial intelligence model is configured to perform material identification processing on the candidate video frames.

In this embodiment of the present disclosure, the material identification processing may be implemented by using an artificial intelligence model, and the artificial intelligence model is a multi-classification model. First, the artificial intelligence model is trained. For example, a plurality of sample multimedia files and an actual type of a material in each sample multimedia file are obtained, and material identification processing is performed on the sample multimedia files by using the artificial intelligence model, to obtain types of materials in the sample multimedia files. If a sample multimedia file is a picture, the artificial intelligence model is used to directly perform material identification processing on the sample multimedia file; and if a sample multimedia file is a video, the artificial intelligence model is used to perform material identification processing on video frames (for example, obtained through periodic frame extraction) in the sample multimedia file.

According to a loss function of the artificial intelligence model, a difference between the type obtained through the material identification processing and the actual type is determined, and the difference is a loss value. Backpropagation is performed in the artificial intelligence model according to the determined difference, and during the backpropagation, a weight parameter of the artificial intelligence model is updated along the gradient descent direction. After the weight parameter of the artificial intelligence model is updated, the updated artificial intelligence model may be used in step 502 to perform material identification processing on the candidate video frames in the multimedia file. In addition, when the to-be-edited multimedia file is a picture, the material identification processing may also be performed according to the updated artificial intelligence model. Through the foregoing model training method, the accuracy of the material identification processing can be improved.

Step 503: Obtain a material editing mode and an interaction template corresponding to the type of the material in the multimedia file.

As shown in FIG. 3E, in this embodiment of the present disclosure, when the multimedia file is a video, periodic frame extraction is performed on the multimedia file, and material identification processing is performed on an extracted video frame, so that the type of the material in the multimedia file can be obtained quickly and accurately.

The following describes an exemplary application of this embodiment of the present disclosure in a practical application scenario. The multimedia processing method based on artificial intelligence provided in the embodiments of the present disclosure may be implemented collaboratively by a terminal device and a server. For example, a software client for multimedia editing is installed in the terminal device, which interacts with the server to implement intelligent editing. The AFAR capability (corresponding to the foregoing material editing capability) and a creative gameplay template (corresponding to the foregoing interaction template) may be componentized. According to the type of the material in the multimedia file selected by the user in the client, the cloud intelligently matches the appropriate AI/AR capability, and then applies the creative gameplay template corresponding to the AI/AR capability to the multimedia file to implement intelligent editing of the multimedia file.

Figure 4:
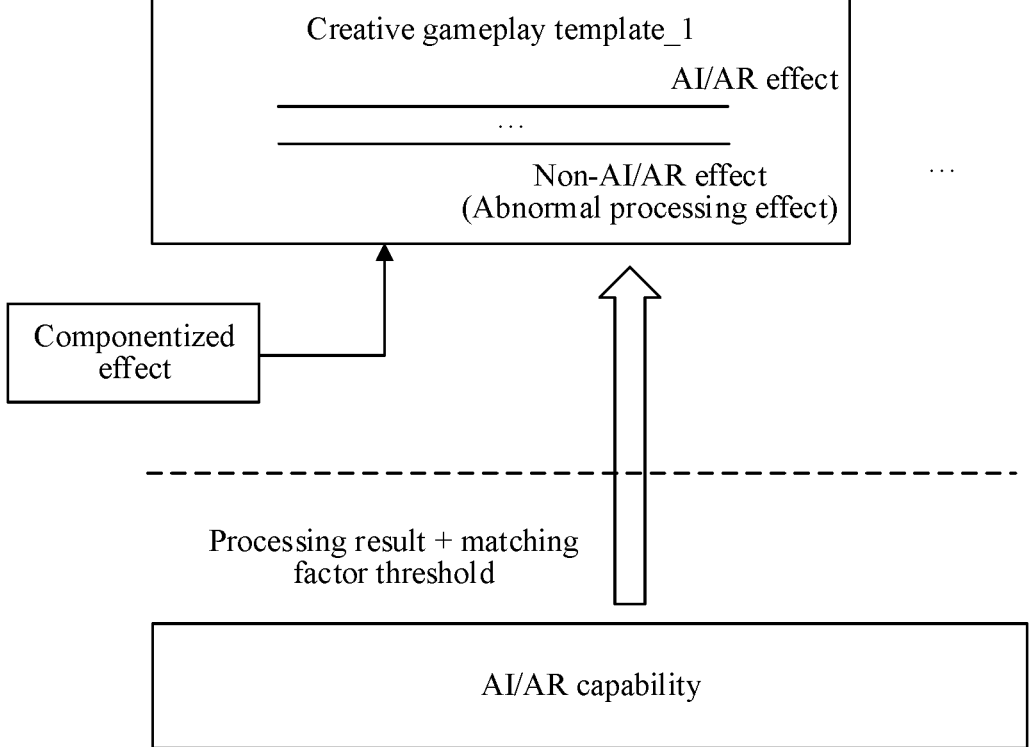
FIG. 4 is a schematic diagram of a creative gameplay template according to an embodiment of the present disclosure.

An embodiment of the present disclosure provides a schematic diagram of creating a creative gameplay template as shown in FIG. 4. In FIG. 4, for each AI/AR capability, according to a corresponding processing result (corresponding to the foregoing matching degree) and a matching factor threshold (corresponding to the foregoing matching degree threshold), at least one creative gameplay template is created. For example, for the face identification capability, a corresponding processing result is an area ratio of the identified face, and a matching factor threshold is an area ratio threshold of the face, such as 50%. In this embodiment of the present disclosure, the creative gameplay template supports componentized effects. Therefore, when a creative gameplay template is created, existing effects may be reused, thereby improving the degree of freedom and efficiency of creating the creative gameplay template. In addition, for cases that the matching degree is less than or equal to the matching factor threshold, or the AI/AR capability handles exceptions, during creation of a creative gameplay template, an abnormal processing effect may be pre-embedded to ensure coherence and integrity of the creative expression when the creative gameplay template is applied. For ease of description, the effect applied according to a processing result of the AI/AR capability is referred to as an AI/AR effect (corresponding to the first effect above), and the abnormal processing effect is referred to as a non-AFAR effect (corresponding to the second effect above). For example, the AI effect may be a magic pendant, a face special effect, a picture for replacing a background, or a music free point component, and the AR effect may be a stall effect or a virtual animation character effect.

Figure 5:
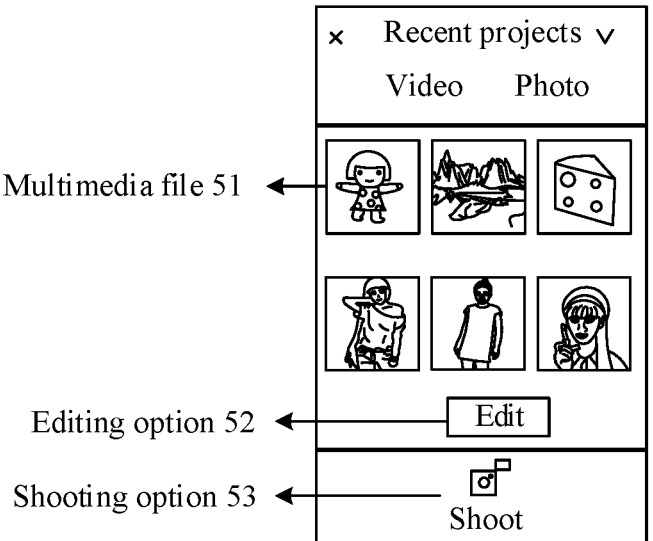
FIG. 5 is a schematic diagram of selecting a multimedia file according to an embodiment of the present disclosure.

An embodiment of the present disclosure provides a schematic diagram of selecting a multimedia file as shown in FIG. 5. In FIG. 5, a plurality of multimedia files stored locally on a client (client running on a terminal device) are shown, for example, a multimedia file 51. The form of the multimedia file includes but is not limited to video and picture. The user may select a multimedia file for intelligent editing by triggering an editing option 52 in FIG. 5, or may trigger a shooting option 53 to perform real-time shooting to obtain a to-be-edited multimedia file.

Figure 6:
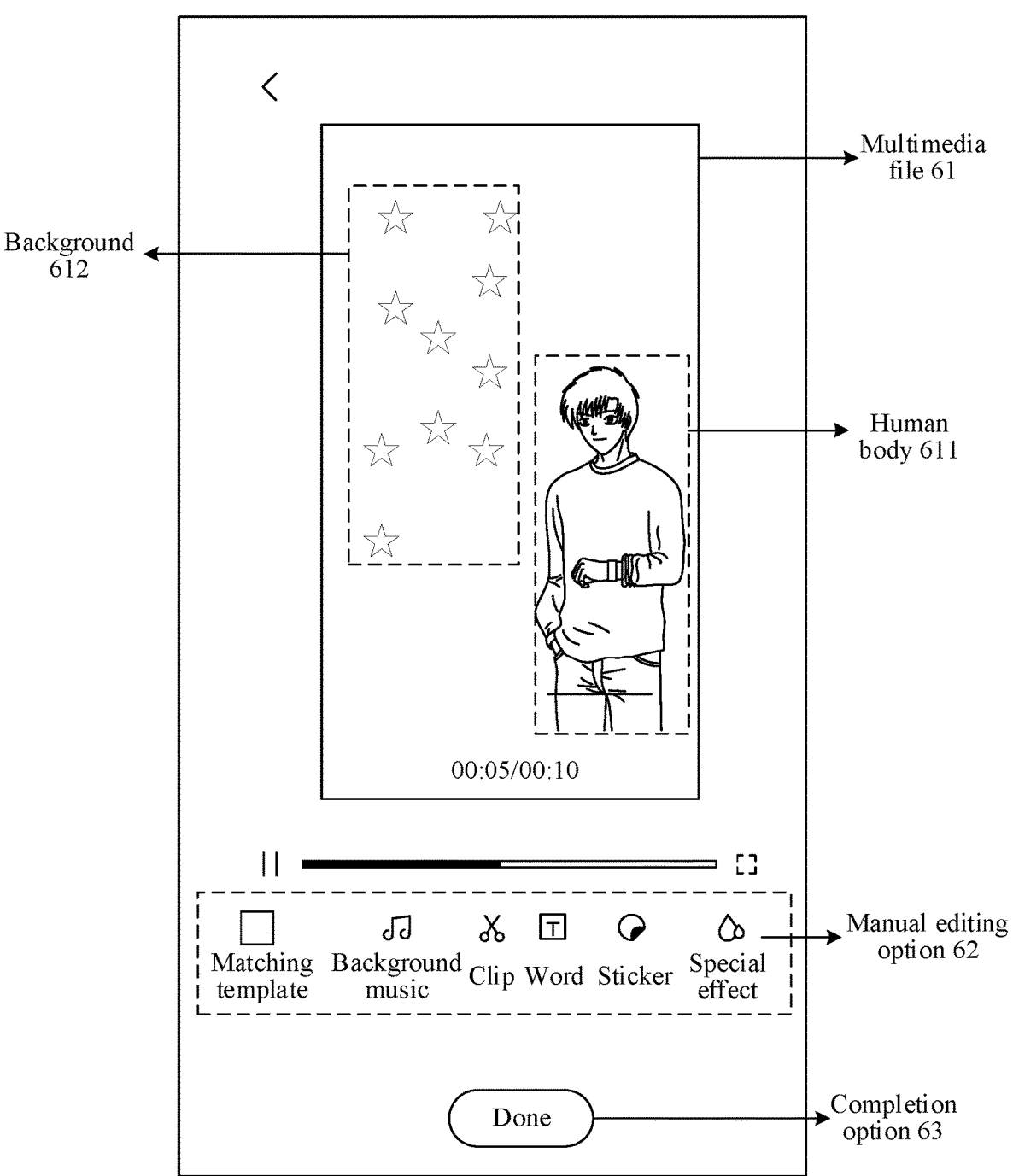
FIG. 6 is a schematic diagram of a multimedia file after a creative gameplay template is applied according to an embodiment of the present disclosure.

An embodiment of the present disclosure provides a schematic diagram of a multimedia file after a creative gameplay template is applied as shown in FIG. 6. In FIG. 6, an applied AFAR capability is a background identification capability, and a corresponding creative gameplay template includes an AFAR effect shown in the background 612. When the creative gameplay template is applied, the background (for example, the sky) other than a human body 611 in the multimedia file 61 is replaced with the background 612 in the creative gameplay template. When the multimedia file 61 after the background is replaced is displayed, manual editing options 62 may be further displayed. The user may manually edit the multimedia file 61 by triggering the manual editing options 62, such as switching the applied creative gameplay template, adding or switching background music, making manual edits, or adding extra effects (for example, text, stickers, or special effects). When the user is satisfied with the multimedia file 61, a completion option 63 may be triggered to complete editing, and the client may store the edited multimedia file 61 locally, or send the multimedia file to a social network for sharing, which is not limited in the embodiments of the present disclosure.

Figure 7:
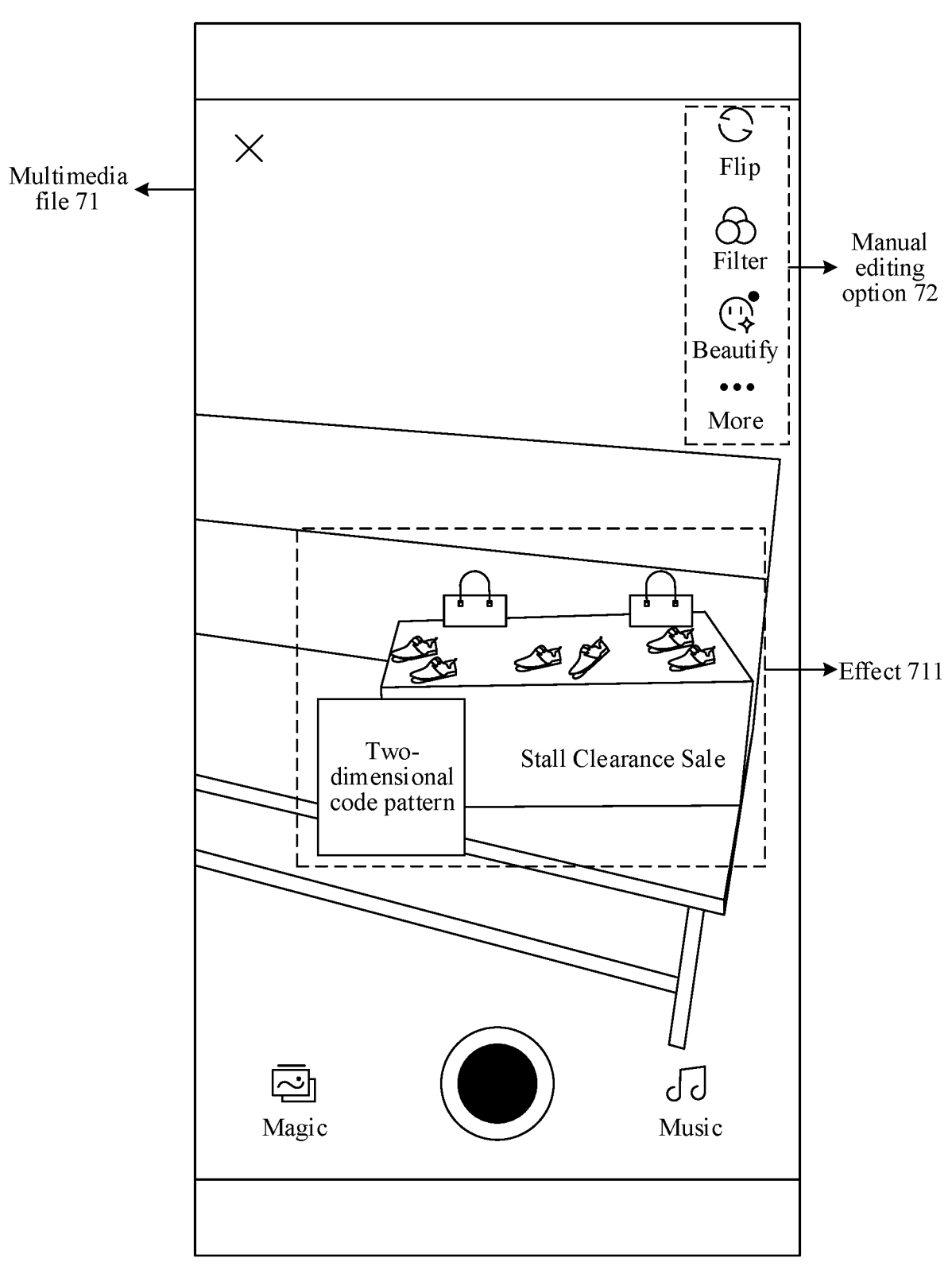
FIG. 7 is a schematic diagram of a multimedia file after a creative gameplay template is applied according to an embodiment of the present disclosure.

An embodiment of the present disclosure further provides a schematic diagram of a multimedia file after a creative gameplay template is applied as shown in FIG. 7. In FIG. 7, a multimedia file 71 is obtained by real-time shooting, where the background is a workstation, the applied AR capability is an AR capability to identify the workstation, and the applied creative gameplay template includes an effect 711. Therefore, an augmented reality sensory effect of setting up a stall on the workstation is realized. In addition, manual editing options 72 for the multimedia file 71 are further displayed, including options such as flipping, filtering, and beautifying, and options for adding magic effects and adding music.

Figure 8:
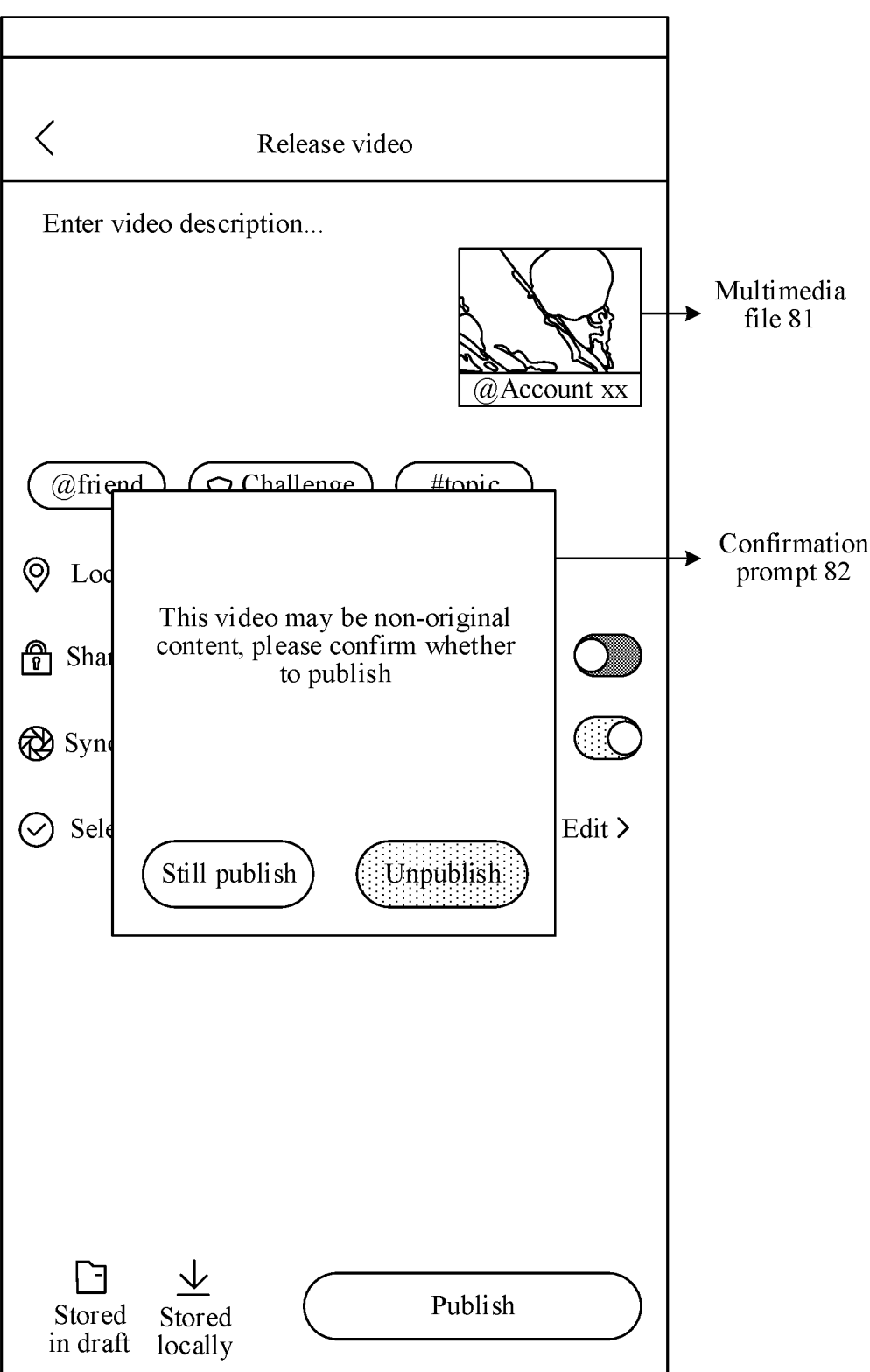
FIG. 8 is a schematic diagram of a confirmation prompt according to an embodiment of the present disclosure.

An embodiment of the present disclosure further provides a schematic diagram of a confirmation prompt as shown in FIG. 8. In FIG. 8, when the user publishes a multimedia file 81, for example, shares the multimedia file 81 to a social network, the client identifies, according to the AI/AR capability used for detecting a watermark, that there is a watermark of "@account xx" in the multimedia file 81, and outputs a confirmation prompt 82 to remind the user. Based on this, a creative gameplay template including an effect of masking a watermark may be further applied to the multimedia file 81 to mask the watermark in the multimedia file 81. In FIG. 6, FIG. 7, and FIG. 8, only the creative gameplay template integrating a single AI/AR effect is shown, but in practical application scenarios, a creative gameplay template may alternatively include a plurality of AFAR effects, which is not limited in the embodiments of the present disclosure.

The types of the AI/AR capabilities are not limited in the embodiments of the present disclosure. As shown in FIG. 9, various AI/AR capabilities are shown, such as intelligent editing (a capability 91 in FIG. 9), intelligent filtering, stylized filtering, and face fusion. Certainly, this does not constitute a limitation on the embodiments of the present disclosure. According to different actual application scenarios, more AI/AR capabilities, such as gender conversion and face beauty degree prediction, may be applied.

Figure 10:
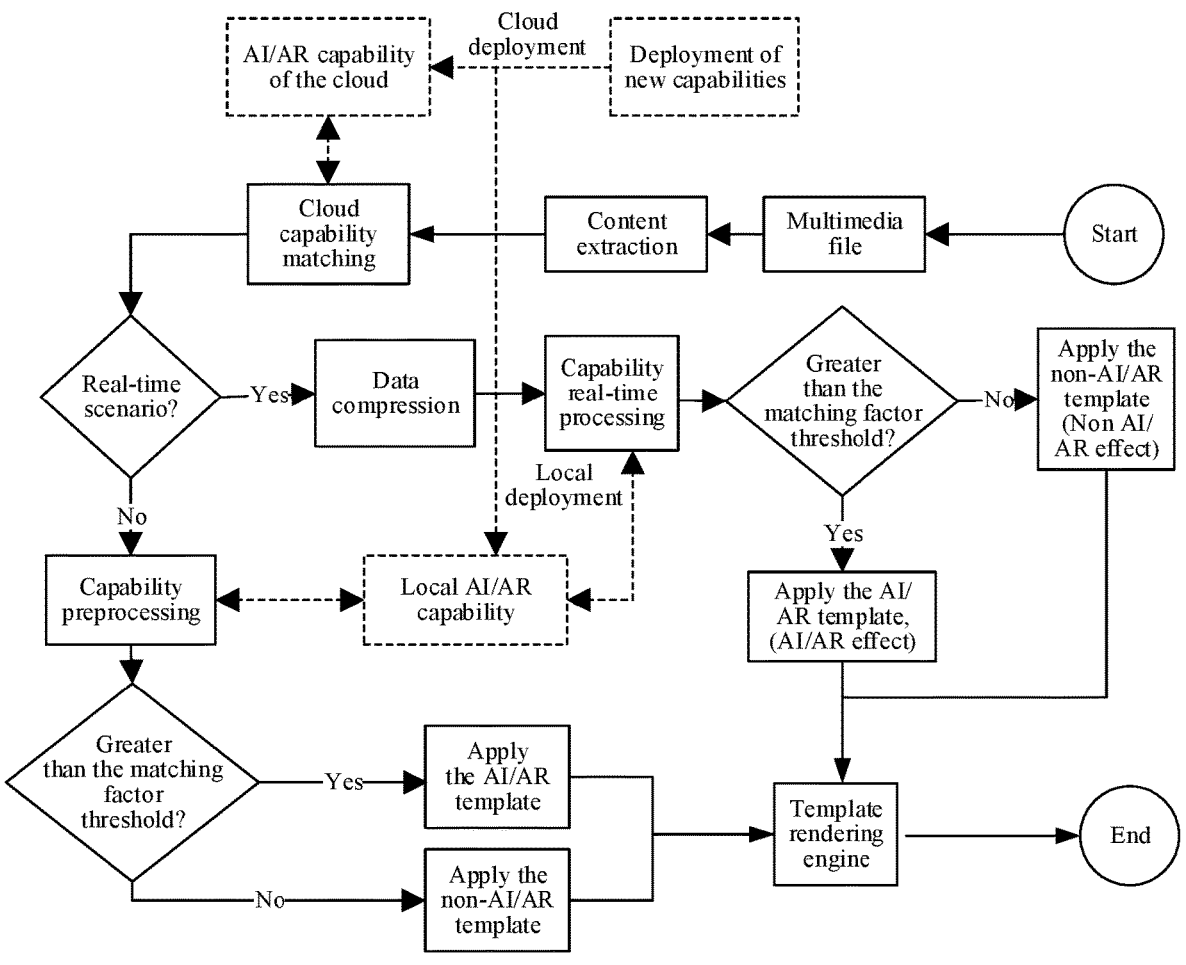
FIG. 10 is a schematic flowchart of a multimedia processing method based on artificial intelligence according to an embodiment of the present disclosure.

For the bottom layer implementation of intelligent editing, an embodiment of the present disclosure provides a schematic flowchart as shown in FIG. 10, and for ease of understanding, the description is made in three stages.

1) The first stage: intelligent matching of cloud capabilities.

After obtaining the to-be-edited multimedia file, if the multimedia file is a picture, the client directly sends the multimedia file to the server (that is, the cloud); and if the multimedia file is a video, the client performs frame extraction according to a set frame extraction frequency (that is, content extraction in FIG. 10), and send a plurality of obtained candidate video frames to the server for capability matching. To balance performance and quality, whether to perform compression may be determined according to a data amount (corresponding to the storage space occupied above) of the obtained plurality of candidate video frames.

After receiving the plurality of candidate video frames sent by the client, the server performs concurrent matching through a plurality of AFAR capabilities deployed in the cloud, and delivers the appropriate AI/AR capabilities and corresponding creative gameplay templates to the client according to matching results. For example, the type of the material in the plurality of candidate video frames may be identified through the artificial intelligence model. If a face is identified, an AI/AR capability for face identification and a corresponding creative gameplay template are delivered; and if a sky is identified, an AFAR capability for sky identification (one-click sky change) and a corresponding creative gameplay template are delivered. The plurality of AI/AR capabilities and creative gameplay templates corresponding to the AFAR capabilities may be deployed locally on the client. In this case, the server only needs to deliver an identifier (or a number) of an AI/AR capability and an identifier (or a number) of a creative gameplay template, so that the consumption of communication resources can be reduced. In addition, when no suitable AFAR capabilities are matched, editing may be ended directly.

2) The second stage: differentiated processing of application scenarios. A scenario in which the multimedia file is a picture is determined as a non-real-time scenario, and a scenario in which the multimedia file is a video is determined as a real-time scenario.

For non-real-time scenarios, since there is no real-time requirement or the requirement is low, the original picture may be processed according to an AFAR capability to achieve higher capability processing accuracy. In addition, since content of the picture is static and unchanged, even if a time attribute or other attributes are added to the picture in service, the applied creative gameplay template may be reused. For example, if a video needs to be generated according to a picture, and a creative gameplay template has been applied to the picture, the creative gameplay template may be continuously applied until a set duration (for example, 10 seconds) is reached.

For real-time scenarios, to meet higher real-time requirements, the original video may be compressed, that is, the video picture may be scaled down to a set size. The set size may be set with reference to the processing consumption time of the AI/AR capability and the accuracy of a processing result.

3) The third stage: local secondary matching and template rendering. After client obtaining the AI/AR capability delivered by the server, the client performs identification processing on the multimedia file according to the AFAR capability, to obtain a processing result. When the multimedia file is a video, identification processing may be performed on a plurality of candidate video frames herein. The obtained processing result is then compared with a matching factor threshold corresponding to the AFAR capability, and a finally applied creative gameplay template is determined according to a comparison result. Since the video frames are compressed in the real-time scenario, for the same AFAR capability, the matching factor threshold set in the real-time scenario may be smaller than a matching factor threshold set in the non-real-time scenario.

For example, if the multimedia file is a picture, and the server delivers a sky identification capability, and an AFAR template and a non-AI/AR template corresponding to the capability, where the non-AI/AR template only includes a non-AI/AR effect, the AI/AR template may include only an AFAR effect, or may include both an AI/AR effect and a non-AI/AR effect. In an example where a matching factor threshold corresponding to the sky identification capability is 70% in the non-real-time scenario, after the client performs identification processing on the picture according to the sky identification capability, if an area ratio of the sky in the picture is greater than the matching factor threshold, for example, the area ratio is 80%, the AI/AR effect in the AI/AR template is applied; and if an area ratio of the sky in the picture is less than or equal to the matching factor threshold, for example, the area ratio is 40%, the non-AI/AR effect in the non-AI/AR template is applied.

Based on the foregoing example, an example is taken in which the multimedia file is a video, and the matching factor threshold corresponding to the sky identification capability is 60% in the real-time scenario. After the client performs identification processing on the plurality of candidate video frames in the video according to the sky identification capability, if an average area ratio of the sky in the plurality of candidate video frames is greater than the matching factor threshold, for example, the average area ratio is 80%, the AI/AR template is applied; and if an average area ratio of the sky in the plurality of candidate video frames is less than or equal to the matching factor threshold, for example, the average area ratio is 40%, the non-AFAR effect in the non-AFAR template is applied.

There may be a plurality of AFAR templates corresponding to the sky identification capability delivered by the server (the plurality of AI/AR templates may correspond to the same matching factor threshold). In this case, if it is determined that the AFAR template is applied, the first AFAR template delivered may be applied by default, or a plurality of AI/AR templates may be displayed for the user to select to apply. When an AI/AR template has been applied, other AFAR templates may be displayed for the user to switch.

If the applied AI/AR template includes both an AI/AR effect and anon-AFAR effects, in the process of applying the AI/AR template, real-time determination may be further performed. That is, for each video frame in the video, if the area ratio of the sky in the video frame is less than or equal to the matching factor threshold, the non-AFAR effect in the AI/AR template is applied; and if the area ratio of the sky in the video frame is greater than the matching factor threshold, the AI/AR effect in the AFAR template is applied.

After the finally applied effect is determined, the corresponding effect may be rendered through a template rendering engine. For example, if the finally applied effect is a starry sky picture used to replace the sky background in the video frame, the effect is rendered by the template rendering engine to update the background in the video frame to the starry sky picture.

Through the embodiments of the present disclosure, the following technical effects can be achieved: 1) A capability and a gameplay above the capability are separated, which resolves the limitation of the design side in the creation of the gameplay, and improves the degree of freedom and efficiency of output of the creative gameplay template. 2) Through intelligent matching, a capability conforming to a multimedia file is obtained, which reduces the threshold for selecting a multimedia file and improves the success rate of editing. 3) Both real-time scenarios and non-real-time scenarios are covered, which allows users to experience more creative gameplays above AI/AR capabilities. 4) A capability and a gameplay are componentized, which realizes the free combination of effects, greatly shortens the cycle of update of creative gameplay templates, and achieves the separation of creative gameplay template iterations and client version iterations.

An exemplary structure in which the multimedia processing apparatus 455 based on artificial intelligence provided in the embodiments of the present disclosure is implemented as software modules. In some embodiments, as shown in FIG. 2, the software modules stored in the multimedia processing apparatus 455 based on artificial intelligence of the memory 450 may include: an obtaining module 4551, configured to obtain, in response to an editing operation for a multimedia file, a material editing mode and an interaction template corresponding to a type of a material in the multimedia file; an application module 4552, configured to identify the material in the multimedia file according to the material editing mode, and apply the interaction template to the identified material; and an application completion module 4553, configured to display the multimedia file after the interaction template is applied.

In some embodiments, the interaction template is configured to form interaction effects that are based on the material, the interaction effects include a first effect and a second effect different from the first effect, and the first effect includes at least one of an augmented reality effect or a virtual reality effect. The application module 4552 is further configured to apply the first effect in the interaction template to the identified material when the identified material meets a material interaction condition corresponding to the material editing mode. The multimedia processing apparatus 455 based on artificial intelligence further includes a set position application module, configured to: obtain, when the identified material does not meet the material interaction condition, a set position corresponding to the second effect in the interaction template, and apply the second effect at the set position in the multimedia file.

In some embodiments, the material interaction condition includes a first material interaction condition corresponding to a non-real-time scenario and a second material interaction condition corresponding to a real-time scenario. The application module 4552 is further configured to identify the material in the multimedia file according to the material editing mode when an editing scenario is the non-real-time scenario, to obtain a matching degree between the material and the multimedia file, and determine that the identified material meets the first material interaction condition when the matching degree is greater than a matching degree threshold in the first material interaction condition; or compress the multimedia file when an editing scenario is the real-time scenario, and identify the material in the compressed multimedia file according to the material editing mode, to obtain a matching degree between the material and the compressed multimedia file, and determine that the identified material meets the second material interaction condition when the matching degree is greater than a matching degree threshold in the second material interaction condition, where the matching degree threshold in the first material interaction condition is greater than the matching degree threshold in the second material interaction condition.

In some embodiments, the multimedia processing apparatus 455 based on artificial intelligence further includes a mode screening module, configured to perform any one of the following processing when there are a plurality of material editing modes: identifying, for each material editing mode, a candidate material in the multimedia file according to the material editing mode, and using the material editing mode as a to-be-applied material editing mode when the candidate material meets a material interaction condition corresponding to the material editing mode; or displaying a preview identification process of the plurality of material editing modes, and using, in response to a selection operation for the material editing modes, a selected material editing mode as a to-be-applied material editing mode, where the to-be-applied material editing mode is used for identifying the material in the multimedia file.

In some embodiments, the mode screening module is further configured to: perform, when the multimedia file is a video, periodic frame extraction on the multimedia file to obtain candidate video frames; and identify the candidate material in the candidate video frames according to the material editing mode; and the application module 4552 is further configured to identify the material in each video frame of the multimedia file according to the to-be-applied material editing mode.

In some embodiments, the multimedia processing apparatus 455 based on artificial intelligence further includes a template screening module, configured to perform any one of the following processing when there are a plurality of interaction templates: using, when the identified material meets a material interaction condition corresponding to any interaction template, the interaction template corresponding to the met material interaction condition as a to-be-applied interaction template; or displaying a preview application process of the plurality of interaction templates, and using, in response to a selection operation for the interaction templates, a selected interaction template as a to-be-applied interaction template.

In some embodiments, the multimedia processing apparatus 455 based on artificial intelligence further includes: a frame extraction module, configured to perform, when the multimedia file is a video, periodic frame extraction on the multimedia file to obtain candidate video frames; and a material identification module, configured to perform material identification processing on the candidate video frames to obtain the type of the material in the multimedia file.

In some embodiments, the multimedia processing apparatus 455 based on artificial intelligence further includes a compression module, configured to compress the plurality of candidate video frames when storage space occupied by the plurality of candidate video frames is greater than a storage space threshold. The material identification module is further configured to: respectively perform material identification processing on the plurality of compressed candidate video frames, to obtain a type of a material in each candidate video frame, and use a type of a material with a largest ratio in the plurality of candidate video frames as the type of the material used for obtaining the corresponding material editing mode, where the ratio includes any one of an area ratio or a quantity ratio of the material.

In some embodiments, the multimedia processing apparatus 455 based on artificial intelligence further includes: a sample obtaining module, configured to obtain a plurality of sample multimedia files; a sample identification module, configured to perform material identification processing on the sample multimedia files by using an artificial intelligence model, to obtain types of materials in the sample multimedia files; and an update module, configured to update a weight parameter of the artificial intelligence model according to differences between the types obtained through the material identification processing and actual types, where the updated artificial intelligence model is configured to perform material identification processing on the candidate video frames.

In some embodiments, the obtaining module 4551 is further configured to: obtain, in candidate material editing modes respectively corresponding to a plurality of types, the material editing mode corresponding to the type of the material in the multimedia file, and obtain at least one interaction template corresponding to the material editing mode.

In some embodiments, the multimedia processing apparatus 455 based on artificial intelligence further includes a prompt display module, configured to display a confirmation prompt corresponding to the identified material, where the confirmation prompt includes at least one of the type of the identified material, location information of the identified material in the multimedia file, or a preview result obtained after the interaction template is applied to the identified material. The application module 4552 is further configured to apply the interaction template to the identified material in response to a confirmation operation for the confirmation prompt.

In some embodiments, the interaction template includes an interaction effect and a duration of the interaction effect; and the application module 4552 is further configured to: apply the interaction effect in the interaction template to the identified material and maintain the applied interaction effect until the duration is reached.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of the present disclosure provides a computer program product or a computer program. The computer program product or the computer program includes computer instructions (executable instructions), and the computer instructions are stored in a computer-readable storage medium. A processor of an electronic device reads the computer instructions from the computer-readable storage medium, and executes the computer instructions, to cause the electronic device to perform the foregoing multimedia processing method based on artificial intelligence according to the embodiments of the present disclosure.

An embodiment of the present disclosure provides a computer-readable storage medium storing executable instructions. The executable instructions, when executed by a processor, cause the processor to perform the method provided in the embodiments of the present disclosure, for example, the multimedia processing method based on artificial intelligence shown in FIG. 3A, FIG. 3B, FIG. 3C, FIG. 3D, or FIG. 3E.

In some embodiments, the computer-readable storage medium may be a memory such as an FRAM, a ROM, a PROM, an EPROM, an EEPROM, a flash memory, a magnetic memory, a compact disc, or a CD-ROM; or may be various devices including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

As an example, the executable instruction may be deployed on one electronic device for execution, or executed on a plurality of electronic devices located at one location, or executed on a plurality of electronic devices distributed at a plurality of locations and interconnected by using a communication network.

Based on the above, the following technical effects can be achieved through the embodiments of the present disclosure:

1) For the to-be-edited multimedia file, the material editing mode and the interaction template corresponding to the type of the material in the multimedia file are obtained, which can improve the success rate of multimedia editing, and improve the utilization rate of computing resources.

2) When the interaction template includes the first effect and the second effect, the corresponding effect is applied according to the identified material, which improves the applicability to different identification situations. When the multimedia file is a video, the continuity and integrity of the applied effect can be guaranteed.

3) When the editing scenario is a real-time scenario, the multimedia file is compressed, which can improve the efficiency of subsequent processing and meet the real-time requirements. In addition, the matching degree threshold in the real-time scenario is set to be smaller than the matching degree threshold in the non-real-time scenario, to conform to the characteristics of compression.

4) When there are a plurality of obtained material editing modes or interaction templates, two screening manners of intelligent selection and human-computer interaction selection are provided, which improves the flexibility and accuracy of screening.

5) When the multimedia file is a video, periodic frame extraction is performed on the multimedia file, and material identification processing is performed on an extracted video frame, so that the type of the material included in the multimedia file can be obtained quickly to meet the real-time requirements.

6) A material editing mode and an interaction template are separated, which resolves the limitation in the creation of the interaction template, and improves the degree of freedom and efficiency of creating the interaction template. Componentized effects can be freely combined when an interaction template is created, which greatly shortens the cycle of update of interaction templates, and achieves the separation of interaction template iterations and client version iterations. That is, regardless of what version the client is, the interaction template only needs to be deployed locally on the client to realize intelligent editing of the multimedia file.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. A multimedia processing method, performed by an electronic device, the method comprising:
   obtaining, in response to an editing operation for a multimedia file, a plurality of material editing modes and an interaction template corresponding to a type of a material in the multimedia file;
   identifying, for one of the material editing modes, a candidate material in the multimedia file according to the material editing mode;
   using the one of the material editing modes as a material editing mode to be applied in response to the candidate material meeting a material interaction condition corresponding to the material editing mode, comprising:
      in a non-real-time scenario, determining a first matching degree between the candidate material and the multimedia file, and determining that the candidate material meets the material interaction condition in response to the first matching degree being greater than a first matching degree threshold;
      in a real-time scenario, compressing the multimedia file and determining a second matching degree between the candidate material and the compressed multimedia file, and determining that the candidate material meets the material interaction condition in response to the second matching degree being greater than a second matching degree threshold, wherein the first matching degree threshold is greater than the second matching degree threshold;
   identifying the material in the multimedia file according to the material editing mode to be applied, and applying the interaction template to the identified material; and
   displaying the multimedia file after the interaction template is applied.

2. The multimedia processing method according to claim 1, wherein
   the identifying a candidate material in the multimedia file according to the material editing mode comprises:
      performing, when the multimedia file is a video, periodic frame extraction on the multimedia file to obtain candidate video frames; and identifying the candidate material in the candidate video frames according to the material editing mode; and
   the identifying the material in the multimedia file according to the material editing mode comprises:
      identifying the material in the candidate video frames of the multimedia file according to the material editing mode.

3. The multimedia processing method according to claim 2, wherein before the identifying the candidate material in the candidate video frames according to the material editing mode, the method further comprises:
   compressing the plurality of candidate video frames when storage space occupied by the plurality of candidate video frames is greater than a storage space threshold; and
   the identifying the candidate material in the candidate video frames according to the material editing mode comprises:
      identifying the candidate material in the compressed candidate video frames according to the material editing mode.

4. The multimedia processing method according to claim 1, wherein there are a plurality of interaction templates, and the method further comprises:
   using, when the identified material meets a material interaction condition corresponding to a candidate interaction template, the candidate interaction template corresponding to the met material interaction condition as the interaction template; or
   displaying a preview application process of the plurality of interaction templates, and using, in response to a selection operation for the interaction templates, a selected interaction template as the interaction template.

5. The multimedia processing method according to claim 4, wherein the displaying a preview application process of the plurality of interaction templates comprises:
   performing at least one of the following processing for one of the plurality of interaction templates:
   displaying a preview application process for the multimedia file according to the interaction template; or
   displaying a preview application process for a sample multimedia file according to the interaction template.

6. The multimedia processing method according to claim 1, further comprising:
   performing, when the multimedia file is a video, periodic frame extraction on the multimedia file to obtain candidate video frames; and
   performing material identification processing on the candidate video frames to obtain the type of the material in the multimedia file.

7. The multimedia processing method according to claim 6, wherein
   before the performing material identification processing on the candidate video frames, the method further comprises:
      compressing the plurality of candidate video frames when storage space occupied by the plurality of candidate video frames is greater than a storage space threshold; and
   the performing material identification processing on the candidate video frames to obtain the type of the material in the multimedia file comprises:
      respectively performing material identification processing on the plurality of compressed candidate video frames, to obtain a type of a material in each of the candidate video frames, and using a type of a material with a largest ratio in the plurality of candidate video frames as the type of the material used for obtaining the corresponding material editing mode, wherein the ratio comprises any one of an area ratio or a quantity ratio of the material.

8. The multimedia processing method according to claim 6, further comprising:

obtaining a plurality of sample multimedia files;

performing material identification processing on the sample multimedia files by using an artificial intelligence model, to obtain types of materials in the sample multimedia files; and updating a weight parameter of the artificial intelligence model according to differences between the types obtained through the material identification processing and actual types, wherein the updated artificial intelligence model is configured to perform material identification processing on the candidate video frames.

9. The multimedia processing method according to claim 1, wherein the obtaining a plurality of material editing modes and an interaction template corresponding to a type of a material in the multimedia file comprises:

obtaining, in candidate material editing modes respectively corresponding to a plurality of types, the plurality of material editing modes corresponding to the type of the material in the multimedia file, and obtaining at least one interaction template corresponding to one of the material editing modes.

10. The multimedia processing method according to claim 1, wherein after the identifying the material in the multimedia file according to the material editing mode, the method further comprises:

displaying a confirmation prompt corresponding to the identified material, wherein the confirmation prompt comprises at least one of the type of the identified material, location information of the identified material in the multimedia file, or a preview result obtained after the interaction template is applied to the identified material; and the applying the interaction template to the identified material comprises:

applying the interaction template to the identified material in response to a confirmation operation for the confirmation prompt.

11. The multimedia processing method according to claim 1, wherein the interaction template comprises an interaction effect and a duration of the interaction effect; and the applying the interaction template to the identified material comprises:

applying the interaction effect in the interaction template to the identified material and maintaining the applied interaction effect until the duration is reached.

12. The multimedia processing method according to claim 1, wherein after the identifying the material in the multimedia file according to the material editing mode, the method further comprises:

cropping the multimedia file according to location information of the identified material in the multimedia file; and the applying the interaction template to the identified material comprises:

applying the interaction template to the identified material in the cropped multimedia file.

13. The multimedia processing method according to claim 12, wherein the cropping the multimedia file according to location information of the identified material in the multimedia file comprises:

cropping, when the location information is time location information, the multimedia file based on time according to a first timestamp and a last timestamp in the time location information; and cropping, when the location information is region location information, the multimedia file based on region according to the region location information.

14. The method according to claim 1, wherein:

the first matching degree between the candidate material and the multimedia file is an area ratio of the candidate material in the multimedia file, and the first matching degree threshold is a first area ratio threshold; and the second matching degree between the candidate material and the compressed multimedia file is an area ratio of the candidate material in the compressed multimedia file, and the second matching degree threshold is a second area ratio threshold.

15. A multimedia processing apparatus, comprising:

a memory, configured to store executable instructions; and a processor, configured, when executing the executable instructions stored in the memory, to implement:

obtaining, in response to an editing operation for a multimedia file, a plurality of material editing modes and an interaction template corresponding to a type of a material in the multimedia file;

identifying, for one of the material editing modes, a candidate material in the multimedia file according to the material editing mode;

using the one of the material editing modes as a material editing mode to be applied in response to the candidate material meeting a material interaction condition corresponding to the material editing mode, comprising:

in a non-real-time scenario, determining a first matching degree between the candidate material and the multimedia file, and determining that the candidate material meets the material interaction condition in response to the first matching degree being greater than a first matching degree threshold;

in a real-time scenario, compressing the multimedia file and determining a second matching degree between the candidate material and the compressed multimedia file, and determining that the candidate material meets the material interaction condition in response to the second matching degree being greater than a second matching degree threshold, wherein the first matching degree threshold is greater than the second matching degree threshold;

identifying the material in the multimedia file according to the material editing mode to be applied, and applying the interaction template to the identified material; and displaying the multimedia file after the interaction template is applied.

16. A non-transitory computer-readable storage medium, storing executable instructions, the executable instructions, when executed by a processor, cause the processor to perform:

obtaining, in response to an editing operation for a multimedia file, a plurality of material editing modes and an interaction template corresponding to a type of a material in the multimedia file;

identifying, for one of the material editing modes, a candidate material in the multimedia file according to the material editing mode;

using the one of the material editing modes as a material editing mode to be applied in response to the candidate material meeting a material interaction condition corresponding to the material editing mode, comprising:

in a non-real-time scenario, determining a first matching degree between the candidate material and the multimedia file, and determining that the candidate material meets the material interaction condition in response to the first matching degree being greater than a first matching degree threshold;

in a real-time scenario, compressing the multimedia file and determining a second matching degree between the candidate material and the compressed multimedia file, and determining that the candidate material meets the material interaction condition in response to the second matching degree being greater than a second matching degree threshold, wherein the first matching degree threshold is greater than the second matching degree threshold;

identifying the material in the multimedia file according to the material editing mode to be applied, and applying the interaction template to the identified material; and displaying the multimedia file after the interaction template is applied.

\* \* \* \* \*